US012713253B2

(12) United States Patent
Akl et al.

(10) Patent No.: US 12,713,253 B2
(45) Date of Patent: Aug. 18, 2026

(54) TECHNIQUES FOR ACQUIRING VALID SYSTEM INFORMATION

(71) Applicant: QUALCOMM Incorporated, San Diego, CA (US)

(72) Inventors: Naeem Akl, Bridgewater, NJ (US); Navid Abedini, Basking Ridge, NJ (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/633,391

(22) Filed: Apr. 11, 2024

(65) Prior Publication Data

US 2025/0324285 A1 Oct. 16, 2025

(51) Int. Cl.

| | |
|---|---|
| ***H04W 24/02*** | (2009.01) |
| ***H04W 52/02*** | (2009.01) |
| ***H04W 68/02*** | (2009.01) |
| ***H04W 72/232*** | (2023.01) |

(52) U.S. Cl.

CPC ....... *H04W 24/02* (2013.01); *H04W 52/0206* (2013.01); *H04W 68/02* (2013.01); *H04W 72/232* (2023.01)

(58) Field of Classification Search

CPC ............... H04W 24/02; H04W 72/232; H04W 52/0206; H04W 68/02

See application file for complete search history.

(56) References Cited

U.S. PATENT DOCUMENTS

2025/0097799 A1* 3/2025 Fu ......................... H04W 48/08
2025/0193795 A1* 6/2025 Wu ......................... H04W 24/02

* cited by examiner

*Primary Examiner* — Elton Williams
(74) *Attorney, Agent, or Firm* — QUALCOMM Incorporated

(57) ABSTRACT

Methods, systems, and devices for wireless communications are described. A user equipment (UE) may receive a first system information message that indicates a first system information type (such as a system information block 1 (SIB1)) of a multitude of different system information types of a first cell, such as a network energy saving (NES) cell or another non-anchor cell. The first system information type may include a set of system configuration parameters associated with the first cell. The UE may then receive, via a second cell that is different from the first cell (such as an anchor cell), an indication of at least one change to the first system information type of the first cell. The UE may then receive, via the first cell, an updated version of the first system information type based on the indication of the at least one change to the first system information type.

30 Claims, 17 Drawing Sheets

TECHNIQUES FOR ACQUIRING VALID SYSTEM INFORMATION

FIELD OF TECHNOLOGY

The following relates to wireless communications, including techniques for acquiring valid system information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for acquiring valid system information. For example, the described techniques may allow a wireless device such as a user equipment (UE) to obtain (and retain) a most up to date version of system information for one or more cells in a wireless communications system. For example, the UE may receive a first system information message that indicates a first system information type (such as a system information block 1 (SIB1)) of a multitude of different system information types of a first cell. In such examples, the UE may support communications with multiple different cells, where the first cell may be a network energy saving (NES) cell or another non-anchor cell, and the first system information type may include a set of system configuration parameters associated with the first cell. The UE may then receive, via a second cell that is different from the first cell (such as an anchor cell that is different from the non-anchor cell), an indication of at least one change to the first system information type of the first cell. The UE may then receive, via the first cell, an updated version of the first system information type based on the indication of the at least one change to the first system information type.

A method for wireless communications by a UE is described. The method may include receiving a first system information message that indicates a first system information type of a set of multiple system information types of a first cell, where the first system information type includes a set of system configuration parameters associated with the first cell, receiving, via a second cell that is different from the first cell, an indication of at least one change to the first system information type of the first cell, and receiving, via the first cell, an updated version of the first system information type based on the indication of the at least one change to the first system information type.

A UE for wireless communications is described. The UE may include one or more memories storing processor executable code, and one or more processors coupled with the one or more memories. The one or more processors may individually or collectively be operable to execute the code to cause the UE to receive a first system information message that indicates a first system information type of a set of multiple system information types of a first cell, where the first system information type includes a set of system configuration parameters associated with the first cell, receive, via a second cell that is different from the first cell, an indication of at least one change to the first system information type of the first cell, and receive, via the first cell, an updated version of the first system information type based on the indication of the at least one change to the first system information type.

Another UE for wireless communications is described. The UE may include means for receiving a first system information message that indicates a first system information type of a set of multiple system information types of a first cell, where the first system information type includes a set of system configuration parameters associated with the first cell, means for receiving, via a second cell that is different from the first cell, an indication of at least one change to the first system information type of the first cell, and means for receiving, via the first cell, an updated version of the first system information type based on the indication of the at least one change to the first system information type.

A non-transitory computer-readable medium storing code for wireless communications is described. The code may include instructions executable by one or more processors to receive a first system information message that indicates a first system information type of a set of multiple system information types of a first cell, where the first system information type includes a set of system configuration parameters associated with the first cell, receive, via a second cell that is different from the first cell, an indication of at least one change to the first system information type of the first cell, and receive, via the first cell, an updated version of the first system information type based on the indication of the at least one change to the first system information type.

In some examples of the method, UEs, and non-transitory computer-readable medium described herein, receiving the first system information message may include operations, features, means, or instructions for receiving one or more second system information messages that indicate the first system information type, where the one or more second system information messages may be received in accordance with a periodicity, may be received in response to one or more system information update requests from the UE, or both.

In some examples of the method, UEs, and non-transitory computer-readable medium described herein, receiving the indication of the at least one change to the first system information type of the first cell may include operations, features, means, or instructions for receiving the indication of the at least one change to the first system information type via a second system information message associated with the second cell.

In some examples of the method, UEs, and non-transitory computer-readable medium described herein, the second system information message may be indicative of the first cell operating in accordance with a first mode of operation, a set of neighboring cells operating in accordance with the first mode of operation, or both.

In some examples of the method, UEs, and non-transitory computer-readable medium described herein, the first mode of operation includes an NES mode of operation, an on-demand system information transmission mode of operation, or both.

In some examples of the method, UEs, and non-transitory computer-readable medium described herein, the second system information message indicates one or more updates to system information for one or more cells of a set of multiple cells and the set of multiple cells includes at least the first cell.

Some examples of the method, UEs, and non-transitory computer-readable medium described herein may further include operations, features, means, or instructions for evaluating a validity of the first system information type based on the second system information message, where the second system information message includes an assistance information message that includes information associated with the first cell.

In some examples of the method, UEs, and non-transitory computer-readable medium described herein, receiving the indication of the at least one change to the first system information type of the first cell may include operations, features, means, or instructions for receiving, via the second cell, the indication of the at least one change to the first system information type via a downlink channel, a downlink control information (DCI) message, or both.

In some examples of the method, UEs, and non-transitory computer-readable medium described herein, receiving the indication of the at least one change to the first system information type via the downlink channel may include operations, features, means, or instructions for receiving the indication of the at least one change to the first system information type via one or more scheduling paging messages of the downlink channel, one or more system information modification messages of the downlink channel, or both.

In some examples of the method, UEs, and non-transitory computer-readable medium described herein, receiving the indication of the at least one change to the first system information type via the downlink channel may include operations, features, means, or instructions for receiving an indication of a radio network temporary ID (RNTI) via the downlink channel, where the RNTI may be indicative of a mode of operation of the first cell, a cell type of the first cell, or both.

In some examples of the method, UEs, and non-transitory computer-readable medium described herein, receiving the updated version of the first system information type may include operations, features, means, or instructions for receiving, at a first time, a first indication of a version identifier (ID) associated with the first system information type of the first cell, receiving, at a second time subsequent to the first time, a second indication of the version ID associated with the first system information type of the first cell, and receiving, via the first cell, the updated version of the first system information type based on the first indication of the version ID being different from the second indication of the version ID.

In some examples of the method, UEs, and non-transitory computer-readable medium described herein, receiving the updated version of the first system information type may include operations, features, means, or instructions for receiving an indication of an update time that the updated version of the first system information type may be created and receiving the updated version of the first system information type based on the first system information type being created at a time that precedes the update time.

In some examples of the method, UEs, and non-transitory computer-readable medium described herein, receiving the updated version of the first system information type may include operations, features, means, or instructions for receiving an indication of a modification period associated with the first system information type, where the at least one change to the first system information type occurs during the modification period and receiving the updated version of the first system information type based on the modification period being elapsed.

In some examples of the method, UEs, and non-transitory computer-readable medium described herein, receiving the updated version of the first system information type may include operations, features, means, or instructions for performing one or more initial access procedures to obtain access to the first cell and receiving the updated version of the first system information type based on the first system information type being invalid during the one or more initial access procedures.

In some examples of the method, UEs, and non-transitory computer-readable medium described herein, receiving the first system information message that indicates the first system information type may include operations, features, means, or instructions for receiving the first system information message via a master information block (MIB) of the first cell, via a paging downlink control channel of the first cell, via a remaining minimum system information (RMSI) scheduling downlink control channel of the first cell, via one or more other downlink control channels associated with the first cell, or any combination thereof.

In some examples of the method, UEs, and non-transitory computer-readable medium described herein, the first system information message includes assistance information that may be indicative of one or more retransmissions of the first system information message that includes the first system information type.

Some examples of the method, UEs, and non-transitory computer-readable medium described herein may further include operations, features, means, or instructions for transmitting one or more messages that request one or more retransmissions of the first system information message that includes the first system information type, where the first system information message includes assistance information that instructs the UE to request the one or more retransmissions of the first system information message.

In some examples of the method, UEs, and non-transitory computer-readable medium described herein, the first system information type includes RMSI or other system information that may be different from the RMSI.

In some examples of the method, UEs, and non-transitory computer-readable medium described herein, the first cell includes an NES capable cell, and the second cell includes an anchor cell.

A method for wireless communications by a network entity is described. The method may include obtaining information indicative of at least one change of a first system information type of a set of multiple system information types of a first cell, where the first cell is different from a second cell associated with the network entity and includes a set of system configuration parameters associated with the first cell and outputting, to a UE associated with the second cell, an indication of the at least one change to the first system information type of the first cell.

A network entity for wireless communications is described. The network entity may include one or more memories storing processor executable code, and one or more processors coupled with the one or more memories. The one or more processors may individually or collectively be operable to execute the code to cause the network entity to obtain information indicative of at least one change of a first system information type of a set of multiple system information types of a first cell, where the first cell is different from a second cell associated with the network entity and includes a set of system configuration parameters associated with the first cell and output, to a UE associated with the second cell, an indication of the at least one change to the first system information type of the first cell.

Another network entity for wireless communications is described. The network entity may include means for obtaining information indicative of at least one change of a first system information type of a set of multiple system information types of a first cell, where the first cell is different from a second cell associated with the network entity and includes a set of system configuration parameters associated with the first cell and means for outputting, to a UE associated with the second cell, an indication of the at least one change to the first system information type of the first cell.

A non-transitory computer-readable medium storing code for wireless communications is described. The code may include instructions executable by one or more processors to obtain information indicative of at least one change of a first system information type of a set of multiple system information types of a first cell, where the first cell is different from a second cell associated with the network entity and includes a set of system configuration parameters associated with the first cell and output, to a UE associated with the second cell, an indication of the at least one change to the first system information type of the first cell.

In some examples of the method, network entities, and non-transitory computer-readable medium described herein, outputting the information indicative of the at least one change to the first system information type of the first cell may include operations, features, means, or instructions for outputting the indication of the at least one change to the first system information type via a second system information message associated with the second cell.

In some examples of the method, network entities, and non-transitory computer-readable medium described herein, the second system information message may be indicative of the first cell operating in accordance with a first mode of operation, a set of neighboring cells operating in accordance with the first mode of operation, or both.

In some examples of the method, network entities, and non-transitory computer-readable medium described herein, the first mode of operation includes an NES mode of operation, an on-demand system information transmission mode of operation, or both.

In some examples of the method, network entities, and non-transitory computer-readable medium described herein, the second system information message indicates one or more updates to system information for one or more cells of a set of multiple cells and the set of multiple cells includes at least the first cell.

In some examples of the method, network entities, and non-transitory computer-readable medium described herein, the second system information message includes an assistance information message that includes information associated with a validity of the first system information type of the first cell.

In some examples of the method, network entities, and non-transitory computer-readable medium described herein, outputting the information indicative of the at least one change to the first system information type of the first cell may include operations, features, means, or instructions for outputting the indication of the at least one change to the first system information type via a downlink channel, a DCI message, or both.

In some examples of the method, network entities, and non-transitory computer-readable medium described herein, outputting the information indicative of the at least one change to the first system information type via the downlink channel may include operations, features, means, or instructions for outputting the indication of the at least one change to the first system information type via one or more scheduling paging messages of the downlink channel, one or more system information modification messages of the downlink channel, or both.

In some examples of the method, network entities, and non-transitory computer-readable medium described herein, outputting the information indicative of the at least one change to the first system information type via the downlink channel may include operations, features, means, or instructions for outputting an indication of an RNTI via the downlink channel, where the RNTI may be indicative of a mode of operation of the first cell, a cell type of the first cell, or both.

In some examples of the method, network entities, and non-transitory computer-readable medium described herein, outputting the information indicative of the at least one change to the first system information type may include operations, features, means, or instructions for outputting, at a first time, a first indication of a version ID associated with the first system information type of the first cell and outputting, at a second time subsequent to the first time, a second indication of the version ID associated with the first system information type of the first cell.

In some examples of the method, network entities, and non-transitory computer-readable medium described herein, outputting the information indicative of the at least one change to the first system information type may include operations, features, means, or instructions for outputting an indication of an update time that an updated version of the first system information type may be created.

In some examples of the method, network entities, and non-transitory computer-readable medium described herein, outputting the information indicative of the at least one change to the first system information type may include operations, features, means, or instructions for outputting an indication of a modification period associated with the first system information type, where the at least one change to the first system information type occurs during the modification period.

In some examples of the method, network entities, and non-transitory computer-readable medium described herein, the first system information type includes RMSI or other system information that may be different from the RMSI.

In some examples of the method, network entities, and non-transitory computer-readable medium described herein, the first cell includes an NES capable cell, and the second cell includes an anchor cell.

DETAILED DESCRIPTION

Figure 1:
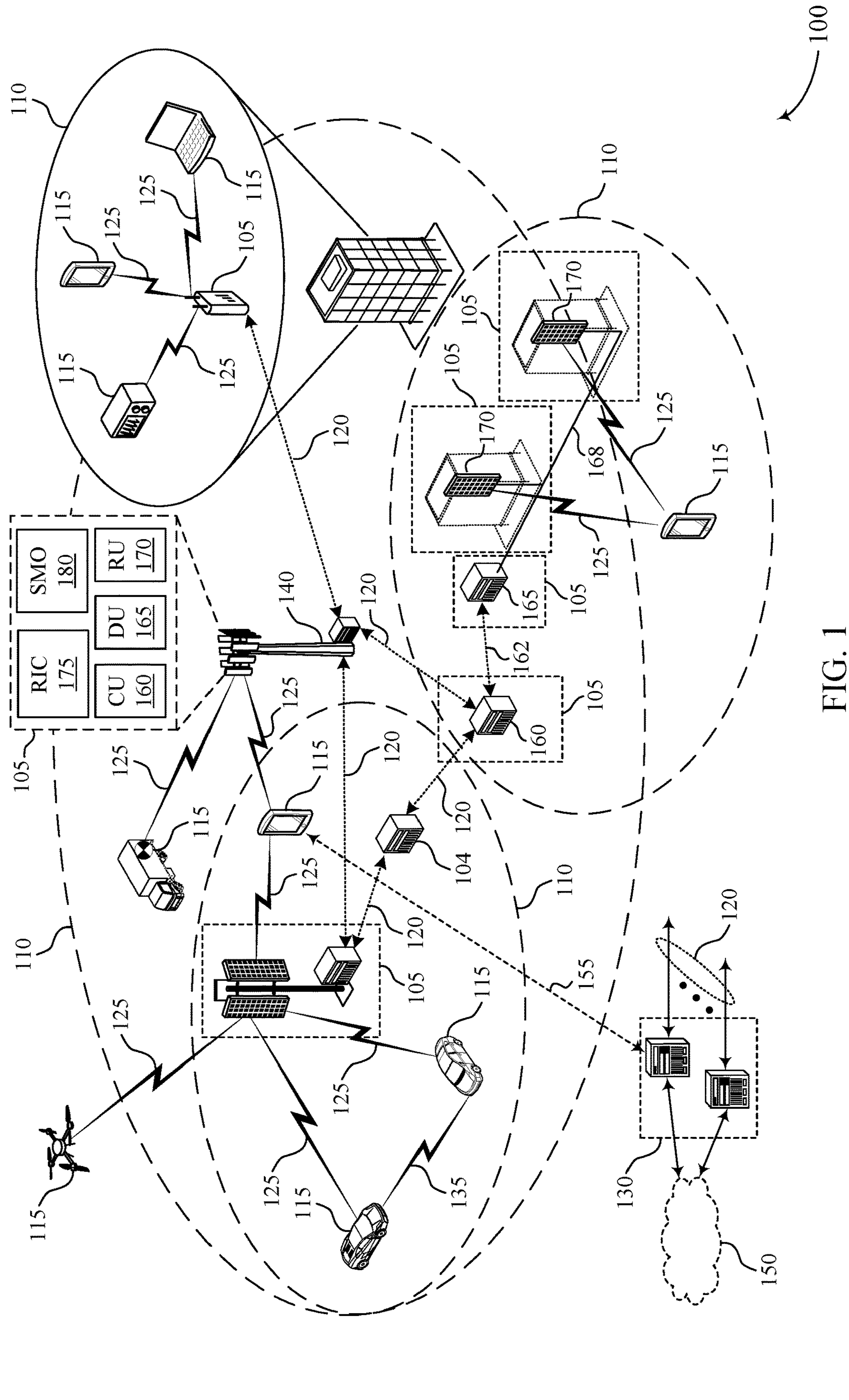
FIG. 1 shows an example of a wireless communications system that supports techniques for acquiring valid system information in accordance with one or more aspects of the present disclosure.

Some wireless communications systems may implement different network energy saving (NES) techniques to reduce environmental impact, increase operational cost savings, and reduce overall power expenditure for devices. Some network deployments may support NES cells, which may deploy one or more energy saving techniques such as efficient power amplifiers, renewable energy sources for powering on-grid and off-grid sites, efficient battery types, and reduced signaling overhead, among other energy saving techniques. In some implementations, a user equipment (UE) may gain access to an NES cell by first receiving system information from the NES cell, including broadcast signaling (generally in the form of a system information block (SIB) such as a SIB1). The SIB1 may include parameters the UE may use to establish an active connection or perform an initial access procedure with the NES cell. In some cases, however, the UE may instead choose to establish an active connection with a different cell, such as an anchor cell, and may store the system information of the NES cell for later use. In at least some scenarios, the system information (e.g., the SIB1) of the NES cell that the UE has stored may become outdated or expired while the UE is connected to the anchor cell. Then, at a later time when the UE attempts to access the NES cell using the outdated stored system information, the cell acquisition will fail due to the use of the outdated system information.

Wireless communications systems may implement various techniques in order to support efficient cell acquisition and to reduce possible initial access failure due to outdated system information. For example, an anchor cell (or any other cell that a UE may be connected to at a given time) may send assistance information to the UE (e.g., via system information of the anchor cell, via downlink control information (DCI), via one or more downlink channel messages) that includes information regarding the stored system information of the NES cell. The UE may then use the information included in the assistance information to determine whether the stored system information for the NES cell (or another cell for which the UE has system information stored) is valid or not. For example, the assistance information from the anchor cell may indicate a version identifier (ID) of a most up to date system information, and if the version ID indicated by the assistance information is different from the assistance information of the stored system information, the UE may determine that the stored system information is outdated. Then, based on the determination of the outdated system information, the UE may re-obtain updated system information from the NES cell. In some other examples, the assistance information may include a time stamp of a last update of the system information of the NES cell, or any other indication that the system information has changed, so that the UE may re-obtain updated system information.

In some other examples, the UE may obtain information from the NES cell regarding how the UE may obtain updated system information. For example, the UE may receive assistance information from the NES cell which indicates a periodicity in which updated system information is broadcasted via the NES cell, such that the UE may identify specific times in which updated system information can be obtained. Additionally or alternatively, the assistance information may instruct the UE to request an updated version of the system information.

Particular aspects of the subject matter described in this disclosure can be implemented to realize one or more of the following potential advantages. For example, the transmission of assistance information that allows the UE to determine whether stored system information is valid or not may reduce the potential signaling overhead for both the UE and the network, as the UE may reduce the number of transmitted requests for updated system information, and the network may reduce the number of broadcasted SIB updates. Additionally or alternatively, the techniques described herein may increase the efficiency of initial access for a UE that connects with an NES or other non-anchor cell, with a reduced quantity of initial access failures occurring based on outdated system information. In some aspects, the techniques described herein may improve the energy savings for NES cells, and increased coverage for UEs within the wireless communications system.

Aspects of the disclosure are initially described in the context of wireless communications systems. Aspects of the disclosure are further illustrated by and described with reference to a network architecture, a process flow, apparatus diagrams, system diagrams, and flowcharts that relate to techniques for acquiring valid system information.

FIG. 1 shows an example of a wireless communications system 100 that supports techniques for acquiring valid system information in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may receive system information via one or more messages. For example, system information for a UE 115 may be classified into one or more master information blocks (MIB) and a set of system information blocks (SIBs). In some implementations, a MIB may include information such as system frame number (SFN) and system bandwidth, and may be broadcast periodically via a physical broadcast channel (PBCH). For example, a MIB may be broadcast in accordance with a periodicity and a repetition number, such as a periodicity of 80 milliseconds with repetitions made within the 80 millisecond intervals. In addition, SIBs may include scheduling and cell access information, and may be transmitted via broadcast signaling on a physical downlink shared channel (PDSCH) or other downlink shared channel (DL-SCH), with a periodicity of 160 milliseconds with variable transmission repetition periodicity within the 160 millisecond periodicity. In some examples, SIBs may be separated into various different SIB messages, such as SIB1, SIB2, SIB3, and so on. SIB1, for example, may include "minimum" system information for acquiring other system information and processing initial access information. Other SIBs (e.g., SIB2, SIB3, and so on) may be carried in system information messages that are also conveyed via a DL-SCH.

In some aspects, a UE 115 may perform system information acquisition at times of cell selection, cell re-selection, times where the UE 115 returns from out-of-coverage, after reconfiguration with synchronization, after entering the wireless communications system 100 from another radio access technology or other cell, after being notified of system information change, among other possible scenarios. In some implementations, the system information may be periodically broadcast to the UE 115, so that the UE 115 may receive updated system information based on a system information transmission periodicity. For example, in some cases a modification period is used, where updated system information messages are broadcasted in the modification period following a period where system information change indication is transmitted. In some aspects, the UE 115 may receive indications about system information modifications via a short message transmitted with P-RNTI associated with one or more downlink control information (DCI) messages. In some aspects, a value tag (e.g., "valueTag") may be included in a system information scheduling information message (e.g., si-SchedulingInfo) for a SIB, and the UE 115 may use the value tag to determine whether a stored version of that SIB is valid or not.

In some aspects, a UE 115 may support on-demand system information delivery. For example, the UE 115 may be operating in an idle or inactive mode, and may receive an uplink wake-up-signal (WUS) via one or more configured signals or channels allocated for the UE 115. In some examples, the UE 115 may receive a WUS configuration (e.g., from one or more network entities 105 associated with an anchor cell), which may be configured by the one or more network entities 105. The UE 115 may then send a WUS transmission to a serving cell based on the WUS configuration, which may include a request for system information (e.g., a request for SIB1 or for a system information update). In some examples, the UE 115 may transmit the SIB1 request during one or more configured WUS occasions to an NES cell, which may send broadcasting information relatively less frequently (or not at all) as compared to non-NES cells. After transmitting the request, the UE 115 may monitor a subsequent system information window to receive the requested SIB from the NES cell, which may transmit the SIB1 more frequently based on the request from the UE 115. In some aspects, the on demand transmission of the SIB triggered by the UE 115 may apply to broadcasting or unicasting communications.

In some implementations, a UE 115 may gain access to an NES cell by first receiving system information from the NES cell, including broadcast signaling (e.g., SIB1). The SIB1 may include parameters the UE 115 may use to establish an active connection with the NES cell. In some cases, however, the UE 115 may instead establish an active connection with a different cell, such as an anchor cell, and may store the system information of the NES cell for later use. In at least some cases, the stored system information of the NES cell may become outdated or expired while the UE 115 is connected to the anchor cell. Then, at a later time when the UE 115 attempts to access the NES cell using the outdated stored system information, the cell acquisition will fail.

The wireless communications system 100 may implement various techniques in order to support efficient cell acquisition and to reduce possible initial access failure due to outdated system information. For example, an anchor cell may send assistance information to the UE 115 that includes information regarding the stored system information of the NES cell. The UE 115 may then use the information included in the assistance information to determine whether the stored system information for the NES cell is valid or not. For example, the assistance information from the anchor cell may indicate a version ID of a most up to date system information, and if the version ID indicated by the assistance information is different from the assistance information of the stored system information, the UE 115 may determine that the stored system information is outdated. Then, based on the determination of the outdated system information, the UE 115 may re-obtain updated system information from the NES cell. In some other examples, the assistance information may include a time stamp of a last update of the system information of the NES cell, or any other indication that the system information has changed, so that the UE 115 may re-obtain updated system information.

Figure 2:
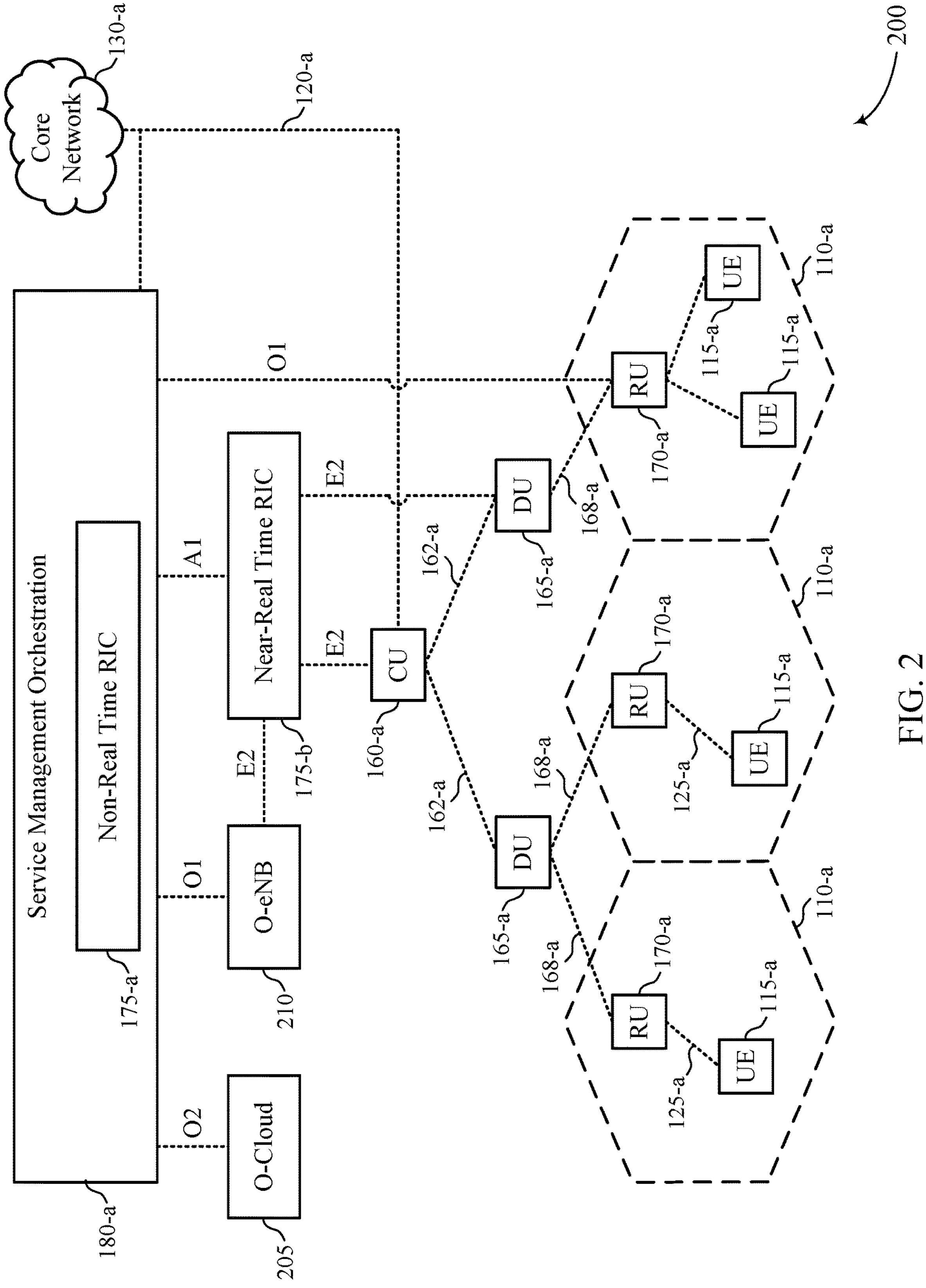
FIG. 2 shows an example of a network architecture that supports techniques for acquiring valid system information in accordance with one or more aspects of the present disclosure.

FIG. 2 shows an example of a network architecture 200 (e.g., a disaggregated base station architecture, a disaggregated RAN architecture) that supports techniques for acquiring valid system information in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Any one or more of the components, functionalities, or nodes of the network architecture 200 may serve as a downlink transmission point or as an uplink reception point associated with a network entity 105 (such as a network entity 105 as illustrated by and described with reference to FIG. 1). Additionally, or alternatively, the network architecture 200 may include additional components, functionalities, or nodes that serve as a downlink transmission point or as an uplink reception point associated with a network entity 105. In some aspects, a network entity 105 may use (e.g., leverage) one or multiple uplink reception points, in addition or as an alternative to uplink capabilities at the network entity 105 itself, to increase the uplink coverage provided by the network entity 105. In some implementations, a UE 115-*a* may support one or more techniques to acquire updated system information via one or more aspects of the network architecture 200.

Figure 3:
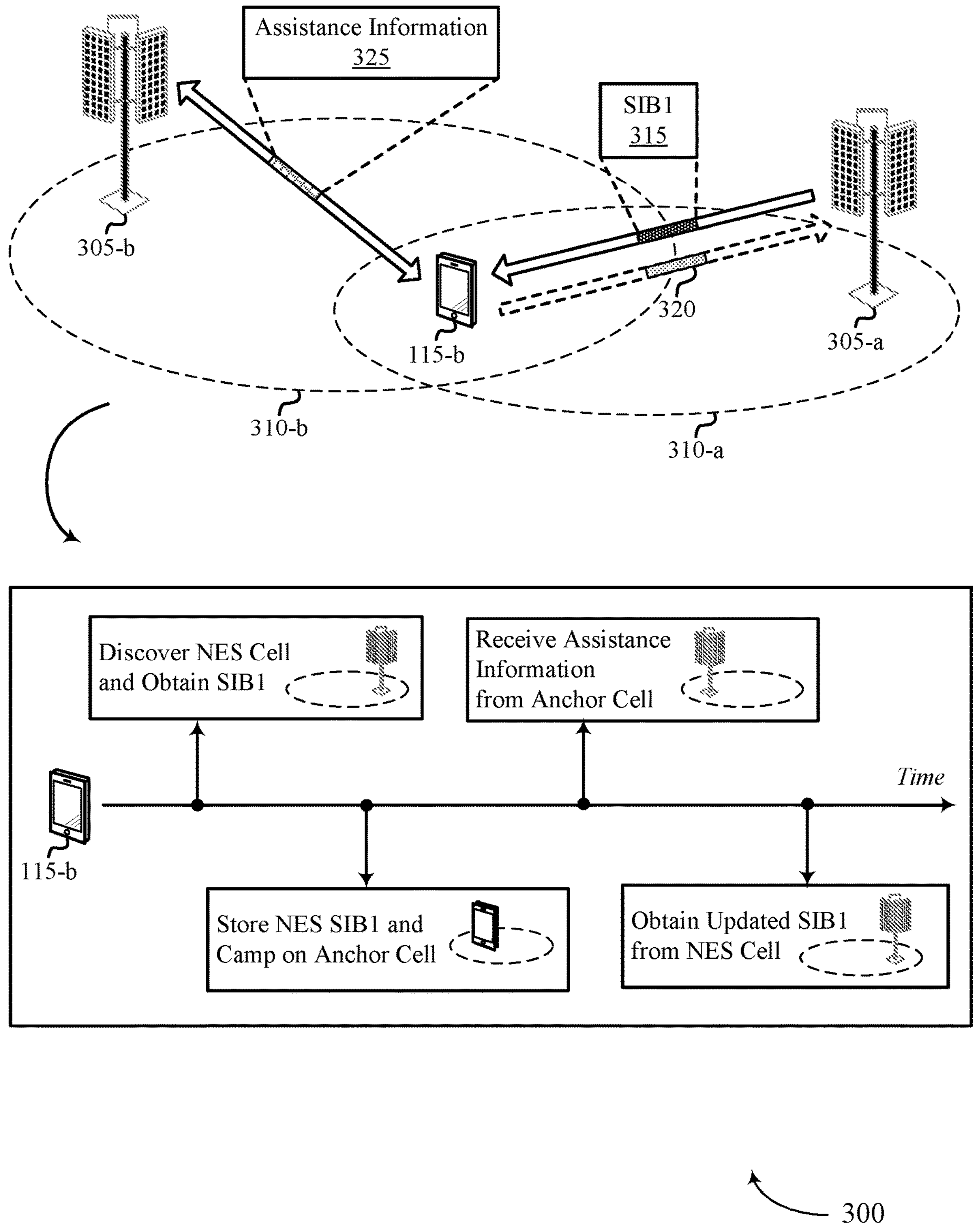
FIGS. 3 and 4 show examples of wireless communications systems that support techniques for acquiring valid system information in accordance with one or more aspects of the present disclosure.

FIG. 3 shows an example of a wireless communications system 300 that supports techniques for acquiring valid system information in accordance with one or more aspects of the present disclosure. For example, the wireless communications system 300 may support communications between a UE 115-*b* and one or more network entities, such as a first network entity 305-*a* and a second network entity 305-*b*, each of which may be examples of UEs and network entities described with reference to FIGS. 1 and 2. In some aspects, the first network entity 305-*a* may operate or otherwise provide service for devices operating in a first cell 310-*a*, which may be an example of an NES cell, or other cell type. The second network entity 305-*b* may operate or otherwise provide service for devices operating in a second cell 310-*b*, which may be an example of a primary cell or anchor cell.

The wireless communications system 300 may implement various different NES techniques to reduce environmental impact, increase operational cost savings, and reduce overall power expenditure for devices. For example, the wireless communications system 300 may support various different types of cell operation, including NES cells, which may implement one or more energy saving techniques such as implementations of efficient power amplifiers, renewable energy sources for powering on-grid and off-grid devices, reduced signaling (e.g., broadcast and unicast signaling), among other power saving techniques. In some aspects, the UE 115-*b* may gain access to an NES cell (e.g., the first cell 310-*a*) by transmitting a request for on-demand system information 320, and receiving system information from the NES cell. In some examples, the system information may include broadcast signaling such as one or more SIBs, including SIB1 315. The broadcasted SIB1 315 may include various parameters that the UE 115-*b* may use to establish an active connection with the NES cell.

In some cases, however, the UE 115-*b* may instead establish a connection with a different cell, such as an anchor cell (e.g., the second cell 310-*b*), and may store the SIB1 315 of the NES cell for later use. In such cases, the UE 115-*b* may camp on the anchor cell based on, for example, the UE 115-*b* choosing to camp on the anchor cell or based on camping being disallowed on the NES cell. In some implementations, however, the SIB1 315 of the NES cell (which is stored at the UE 115-*b*) may become outdated while the UE 115-*b* is connected to the anchor cell. Then, at a later instance, the UE 115-*b* may attempt to access or acquire the NES cell, and the cell acquisition may fail due to the outdated SIB1 315. In at least some cases, the UE 115-*b* may request updated system information from the NES cell based on initial access for the NES cell being triggered by the UE 115-*b*, and the UE 115-*b* may request the most up to date system information irrespective of whether the UE 115-*b* stores a valid SIB1. Frequent requests for updated system information, however, may increase signaling overhead, power expenditure, and latency for initial access.

To support efficient cell acquisition and to reduce initial access failure due to potentially outdated system information, the UE 115-*b* may implement one or more techniques in order to determine whether the stored SIB1 315 is outdated. Additionally or alternatively, the UE 115-*b* may implement one or more techniques in order to efficiently obtain new or updated system information after the system information changes. In some implementations, the anchor cell (e.g., the second cell 310-*b* or any other cell that the UE 115-*b* is currently connected to) may provide the UE 115-*b* with assistance information 325 that includes information regarding the stored system information of the NES cell. For example, the second network entity 305-*b* (associated with the second cell 310-*b*) may transmit the assistance information 325 to the UE 115-*b*, and the UE 115-*b* may use the assistance information 325 to determine whether the stored system information (e.g., SIB1 315) is valid or not. In some examples, the second network entity 305-*b* may receive information from the first network entity 305-*a* (associated with the first cell 310-*a*) which indicates one or more updates or changes to a previous version of system information, and the second network entity 305-*b* may send an indication of the one or more changes in the system information to the UE 115-*b*.

In some implementations, the assistance information 325 may include version ID information related to the system information of the NES cell. For example, the assistance information 325 may indicate a version ID of the most up to date system information of the NES cell, and the UE 115-*b* may compare the version ID indicated by the assistance information 325 to a version ID of the previously-obtained SIB1 315. If the version ID of the most up to date system information indicated by the assistance information 325 is different from the assistance information of the SIB1 315, the UE 115-*b* may re-obtain an updated SIB1 from the NES cell. In some aspects, the version ID may be similar to or may be associated with a value tag of the system information scheduling information included in SIB1. The UE 115-*b* may re-obtain an updated version of the SIB1 315 once the UE 115-*b* determines that the SIB1 315 is outdated. For example, an updated version of the SIB1 315 may be provided by the first cell 310-*a* (e.g., the NES cell).

In some aspects, the version ID of the most up to date system information may be provided by the first cell 310-*a* (e.g., the NES cell). For example, the first network entity 305-*a* may include the version ID within the SIB1 315, or within an updated SIB1 that is requested by the UE 115-*b*. In some other examples, the version ID may be included in other system information messages when both the first cell 310-*a* and the second cell 310-*b* transmit a same version ID counter of the SIB1 315. Additionally or alternatively, in cases where the first cell 310- and the second cell 310-*b* do not transmit a same version ID counter of the SIB1 315, the UE 115-*b* may check the version ID of the SIB1 immediately after the acquisition of the SIB1 315 from the NES cell to determine whether the SIB1 315 is up to date or not.

In some aspects, the second network entity 305-*b* may transmit the assistance information 325 which includes the SIB 1 version ID using a system information message associated with the second cell 310-*b*. For example, the assistance information 325 may be included in a SIB1 of the anchor cell (e.g., the second cell 310-*b*). Additionally or alternatively, the SIB1 that includes the assistance information (e.g., the SIB1 associated with the anchor cell) may include list of NES cells within the wireless communications system 300, along with SIB1 version IDs for each of the listed NES cells. In some aspects, the list of SIB1 version IDs may be included in the SIB1 of the second cell 310-*b* or within other SIBs (e.g., SIB2, SIB3, and so on) of the second cell 310-*b*. In some examples, individual system information (e.g., anchor SIBx) may be assigned on a per-NES cell basis (e.g., such that each NES cell is associated with its own SIB), while in some other examples, system information (e.g., one anchor-SIBx) may be assigned for all NES cells. In some such examples, a change of NES SIB1 may imply that the UE 115-*b* may receive an update of the anchor-SIBx based on the UE 115-*b* being aware of the validity of stored SIB1 315.

In some other examples, the assistance information 325 may include a time stamp that is indicative of a last update of the system information of the NES cell (or multiple time stamps associated with multiple NES cells). For example, the UE 115-*b* may receive, via the assistance information 325 that is included in an anchor SIB1 or other assistance information of the second cell 310-*b*, an indication of a time in which the SIB1 315 was last updated. The UE 115-*b* may then determine whether the stored SIB1 315 is outdated or not based on whether the time of the last update to the system information occurred after the UE 115-*b* received or stored the SIB 315. For example, if the UE 115-*b* stores the SIB1 315 at a first time, and then receives information that the system information was updated at a second time that is after the first time, the UE 115-*b* may determine that the stored SIB1 315 is outdated. Then, based on the determination that the SIB1 315 is outdated, the UE 115-*b* may re-obtain updated system information from the first cell 310-*a*. In some other examples, if the UE 115-*b* stores the SIB1 315 at a first time, and then receives information that the system information was updated at a second time that is prior to the first time, the UE 115-*b* may determine that the stored SIB1 315 is up to date.

In some other examples, the assistance information 325 may include one or more indications that the SIB1 315 has changed relative to a last modification period of the system information, or an indication that the SIB1 315 will change in a subsequent modification period of the system information. For example, the first cell 310-*a*, the second cell 310-*b*, or both, may periodically update system information in accordance with a system information modification period, and the assistance information 325 may indicate that the SIB1 315 has changed relative to the system information modification period of the first cell 310-*a*, the second cell 310-*b*, or both.

Additionally or alternatively, the UE 115-*b* may determine whether to reacquire the SIB1 315 based on a relative time of initial access (e.g., a time in which the UE 115-*b* performed initial access or will perform initial access to the NES cell) compared to an indicated time for change of SIB1 315. For example, if the UE 115-*b* determines that the SIB1 315 will be outdated at a time before the UE 115-*b* performs initial access, the UE 115-*b* may reacquire the SIB1 315.

In some aspects, the second cell 310-*b* (e.g., the anchor cell) may convey the indication of the time of the last update to the SIB1 315 or the indication of a change to the SIB1 315 via one or more DCI messages. For example, one or more indications of the time stamp or the one or more changes to the SIB1 315 may be included in a short message in DCI. Additionally or alternatively, second cell 310-*b* may convey the information using one or more radio network temporary identifiers (RNTI) associated with the first cell 310-*a* (e.g., NES-specific RNTI, RNTI used for NES purposes), which may be included in system information of the second cell 310-*b*

In some aspects, the information included in the assistance information 325 (e.g., the indication of a SIB1 update, the version ID of the SIB1 315, the time of a last update to the SIB1 315, an indication of a change of the SIB1 315) may be communicated from the first cell 310-*a* to the second cell 310-*b* (e.g., via a backhaul from the first cell 310-*a* to the second cell 310-*b*). Additionally or alternatively, the information may be communicated via one or more central entities such as those described with reference to FIG. 2, or may be communicated via other types of signaling between the first network entity 305-*a* and the second network entity 305-*b*.

Figure 4:
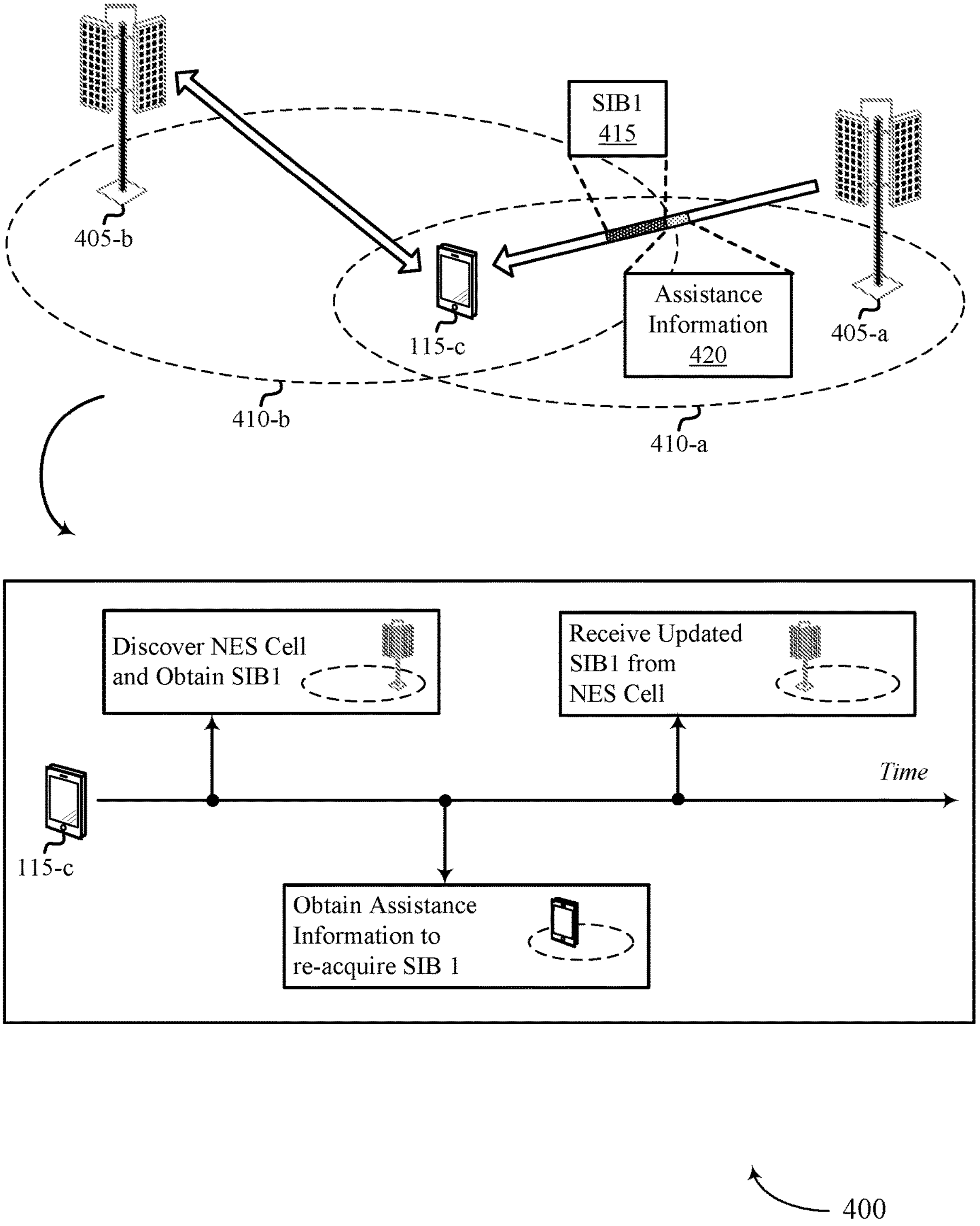

FIG. 4 shows an example of a wireless communications system 400 that supports techniques for acquiring valid system information in accordance with one or more aspects of the present disclosure. For example, the wireless communications system 400 may support communications between a UE 115-*c* and one or more network entities, such as a first network entity 405-*a* and a second network entity 405-*b*, each of which may be examples of UEs and network entities described with reference to FIGS. 1-3. In some aspects, the first network entity 405-*a* may operate or otherwise provide service for devices operating in a first cell 410-*a*, which may be an example of an NES cell, or other cell type. The second network entity 305-*b* may operate or otherwise provide service for devices operating in a second cell 310-*b*, which may be an example of a primary cell or anchor cell.

In some aspects, the UE 115-*c* may gain access to an NES cell (e.g., the first cell 410-*a*) by receiving broadcasted system information (e.g., SIB1 415) from the NES cell. The broadcasted SIB1 415 may include various parameters that the UE 115-*c* may use to establish an active connection with the NES cell.

In some implementations, however, the SIB1 315 of the NES cell (which is stored at the UE 115-*b*) may become outdated, and the UE 115-*c* may receive an indication of one or more changes of the SIB1 415. For example, the UE 115-*c* may receive one or more messages from the first cell 410-*a* that the SIB 1 415 has changed or will change at a future time, or an indication of a different version of the SIB1 415 which indicates that a stored version of the SIB1 415 is invalid, or any other indication of a change to the SIB1 415. In at least some cases, the UE 115-*c* may reselect the first cell 410-*a* or the second cell 410-*b* in order to obtain an updated version of the SIB1 415. In some other cases, the UE 115-*c* may request updated system information from the NES cell (e.g., the first cell 410-*a*) based on the indication of the change in system information. Frequent requests for updated system information or cell reselection, however, may increase signaling overhead, power expenditure, and latency for initial access, and may be relatively inefficient for the UE 115-*c*.

In some implementations, the first cell 410-*a* may provide assistance information 420 when the UE 115-*c* acquires the SIB1 415 (or other system information) which includes information regarding how the UE 115-*c* may efficiently reacquire updated system information for the first cell 410-*a*. For example, the assistance information 420 may include information that is indicative of different times that the SIB1 is broadcasted (e.g., whether a new SIB1 will be broadcasted immediately without demand from the UE 115-*c*), including a quantity of periods in which the SIB1 will be broadcasted, locations where the SIB1 will be broadcasted, among other broadcast information of the SIB1. Additionally or alternatively, the assistance information may indicate whether the UE 115-*c* should request (e.g., demand) an updated SIB1. In some aspects, the assistance information 420 may be indicated by one or more DCI messages (e.g., short messages) that indicate system information modification.

In some implementations, the UE 115-*c* may receive the assistance information 420 from the first cell 410-*a* (e.g., an NES cell or a cell that sends the SIB1 415) based on the UE 115-*c* determining whether the stored SIB1 415 version is valid or not. In such implementations, the UE 115-*c* may be camping on the first cell 410-*a* (e.g., an NES cell or other cell type) or on the second cell 410-*b* (e.g., an anchor cell). In some examples, the UE 115-*c* may determine whether the SIB1 415 is valid or not, and if the SIB1 415 is valid, the UE 115-*c* may skip system information re-acquisition across cell reselections if the UE 115-*c* stores a valid SIB1. Additionally or alternatively, the UE 115-*c* may skip system information re-acquisition across cell reselections up to a threshold period of time (e.g., three hours or other threshold time) following the acquisition of the valid SIB1.

In some aspects, the UE 115-*c* may receive the assistance information 420 via a master information block (MIB) or other system information of the first cell 410-*a* (or whichever cell sends the SIB1 415). Additionally or alternatively, the UE 115-*c* may receive the assistance information 420 via a downlink control channel (e.g., a physical downlink control channel (PDCCH)) of the first cell 410-*a* (or whichever cell sends the SIB1 415), where the downlink control channel may be a paging PDCCH, a remaining minimum system information (RMSI) scheduling PDCCH, or any other PDCCH.

Figure 5:
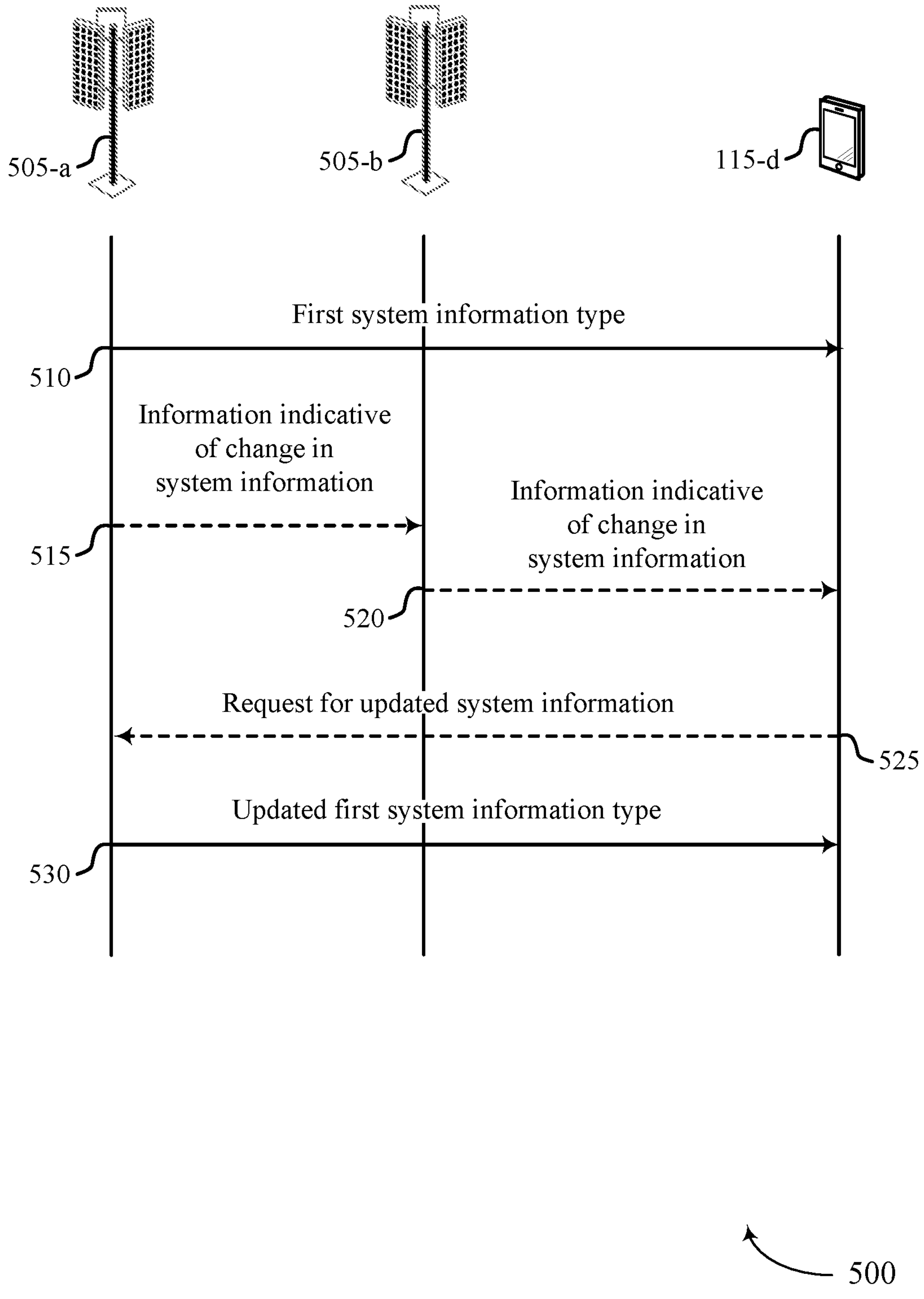
FIG. 5 shows an example of a process flow that supports techniques for acquiring valid system information in accordance with one or more aspects of the present disclosure.

FIG. 5 shows an example of a process flow 500 that supports techniques for acquiring valid system information in accordance with one or more aspects of the present disclosure. The process flow 500 may implement or be implemented to realize aspects of the wireless communications system 100, the network architecture 200, the wireless communications system 300, or the wireless communications system 400. For example, the process flow 500 illustrates communication between a UE 115-*d*, a first network entity 505-*a*, and a second network entity 505-*b*, which may be examples of corresponding devices described herein. In some implementations, the first network entity 505-*a* and the second network entity 505-*b* may be associated with a first cell (e.g., a NES cell) and a second cell (e.g., an anchor cell), respectively.

Alternative examples of the following may be implemented. Some steps are performed in a different order than described or are not performed at all. In some implementations, steps may include additional features not mentioned below, or further steps may be added. Further, although the UE 115-*d*, the first network entity 505-*a*, the second network entity 505-*b* are shown performing the operations of the process flow 500, some aspects of some operations may also be performed by one or more other wireless communication devices (such as by multiple network entities, multiple UEs, or in accordance with coordination among multiple network entities).

At 510, the UE 115-*d* may receive a first system information message (e.g., RMSI or other system information) that indicates a first system information type of a plurality of system information types (e.g., a SIB1 of multiple different SIBs) of a first cell, where the first system information type includes a set of system configuration parameters associated with the first cell. In some examples, the first network entity 505-*a* may transmit one or more second system information messages that indicate the first system information type, where the one or more second system information messages are transmitted by the first network entity 505-*a* in accordance with a periodicity, are transmitted in response to one or more system information update requests from the UE 115-*d*, or both. In some examples, the first system information message includes assistance information that is indicative of one or more retransmissions of the first system information message that includes the first system information type.

At 515, the first network entity 505-*a* (e.g., the network entity associated with the first cell) may transmit or otherwise indicate to the second network entity 505-*b* (e.g., the network entity associated with the second cell) that at least one change has occurred for the first system information type of the first cell.

At 520, the second network entity 505-*b* may transmit an indication of the at least one change to the first system information type of the first cell. In some examples, the second network entity 505-*b* may transmit the indication of the at least one change to the first system information type via a second system information message associated with the second cell. For example, an anchor cell may convey a change in system information of an NES cell via a SIB associated with the anchor cell. In some examples, the second system information message may be indicative of the first cell operating in accordance with a first mode of operation (e.g., an NES mode, an on-demand system information transmission mode of operation, or another mode of operation), a set of neighboring cells operating in accordance with the first mode of operation (e.g., an NES mode, an on-demand system information transmission mode of operation, or another mode of operation), or both.

In some aspects, the second system information message indicates one or more updates to system information for one or more cells of a set of cells, where the set of cells includes at least the first cell. In some aspects, the UE 115-*d* may evaluate a validity of the first system information type based on the second system information message, where the second system information message is an assistance information message that includes information associated with the first cell.

The UE 115-*d* may receive the indication of the at least one change to the first system information type via one or more downlink messages. For example, the UE 115-*d* may receive the indication of the at least one change to the first system information type via a downlink channel (e.g., PDCCH, PDSCH), via one or more DCI messages, or both. In some examples, the UE 115-*d* may receive the indication of the at least one change to the first system information type via one or more scheduling paging messages of the downlink channel, one or more system information modification messages of the downlink channel, or both. Additionally or alternatively, the UE 115-*d* may receive an indication of one or more RNTIs via the downlink channel, where the one or more RNTIs are indicative of a mode of operation of the first cell (e.g., an NES mode of operation), a cell type of the first cell, or both.

In some aspects, the first cell and the second cell may be a same cell, and the UE 115-*d* may receive the first system information message via a MIB of the first cell, via a paging downlink control channel of the first cell, via an RMSI scheduling downlink control channel of the first cell, via one or more other downlink control channels associated with the first cell, or any combination thereof.

At 525, the UE 115-*d* may optionally transmit an indication of a request for updated system information (e.g., an updated version of the first system information type) to the first network entity 505-*a*. For example, the UE may transmit one or more messages that request one or more retransmissions of the first system information message that includes the first system information type, where the first system information message includes assistance information that instructs the UE to request the one or more retransmissions of the first system information message.

At 530, the UE 115-*d* may receive, via the first network entity 505-*a* associated with the first cell, an updated version of the first system information type based on the indication of the at least one change to the first system information type.

In some aspects, in order to receive the updated version of the first system information type, the UE 115-*d* may receive, at a first time, a first indication of a version identifier associated with the first system information type of the first cell. The UE 115-*d* may then receive, at a second time subsequent to the first time, a second indication of the version identifier associated with the first system information type of the first cell. The UE 115-*d* may then receive, via the first cell, the updated version of the first system information type based on the first indication of the version identifier being different from the second indication of the version identifier (or otherwise indicating that the first system information type has changed).

Additionally or alternatively, the UE 115-*d* may receive an indication of an update time that the updated version of the first system information type is created. The UE 115-*d* may then receive the updated version of the first system information type based on the first system information type being created at a time that precedes the update time.

Additionally or alternatively, the UE 115-*d* may receive an indication of a modification period associated with the first system information type, where the at least one change to the first system information type occurs during the modification period. The UE 115-*d* may then receive the updated version of the first system information type based on the modification period being elapsed.

In some examples, the UE 115-*d* may attempt one or more initial access procedures to obtain access to the first cell. In some such examples, the UE 115-*d* may receive the updated version of the first system information type based on the first system information type being invalid during the one or more initial access procedures (e.g., if an initial access fails due to outdated system information, the UE 115-*d* may receive updated system information and attempt to access the first cell using the updated system information).

Figure 6:
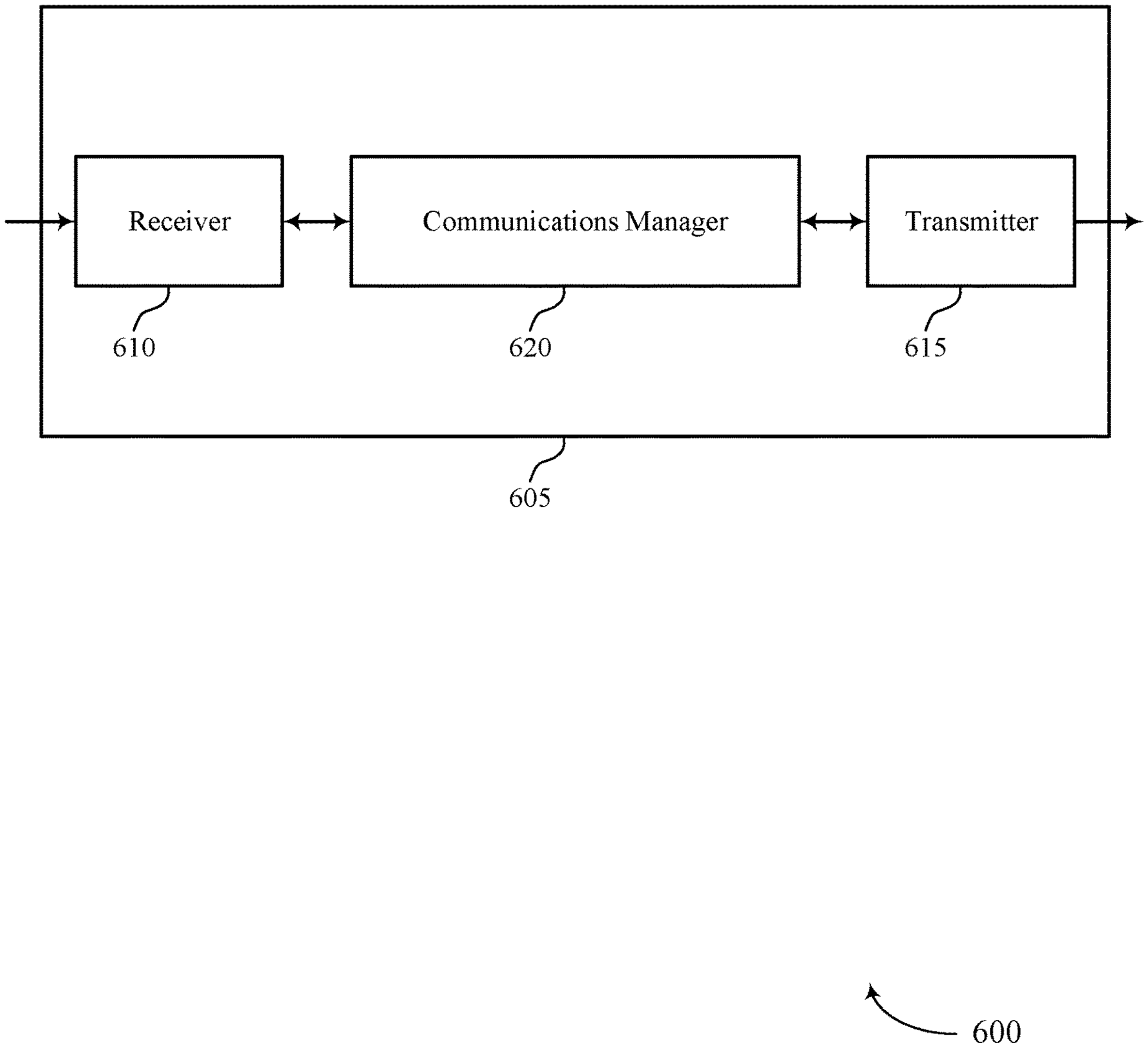
FIGS. 6 and 7 show block diagrams of devices that support techniques for acquiring valid system information in accordance with one or more aspects of the present disclosure.

FIG. 6 shows a block diagram 600 of a device 605 that supports techniques for acquiring valid system information in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for acquiring valid system information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for acquiring valid system information). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of techniques for acquiring valid system information as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a first system information message that indicates a first system information type of a set of multiple system information types of a first cell, where the first system information type includes a set of system configuration parameters associated with the first cell. The communications manager 620 is capable of, configured to, or operable to support a means for receiving, via a second cell that is different from the first cell, an indication of at least one change to the first system information type of the first cell. The communications manager 620 is capable of, configured to, or operable to support a means for receiving, via the first cell, an updated version of the first system information type based on the indication of the at least one change to the first system information type.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, more efficient utilization of communication resources, reduced signaling overhead, improved cell acquisition, increased efficiency for initial access, among other advantages.

Figure 7:
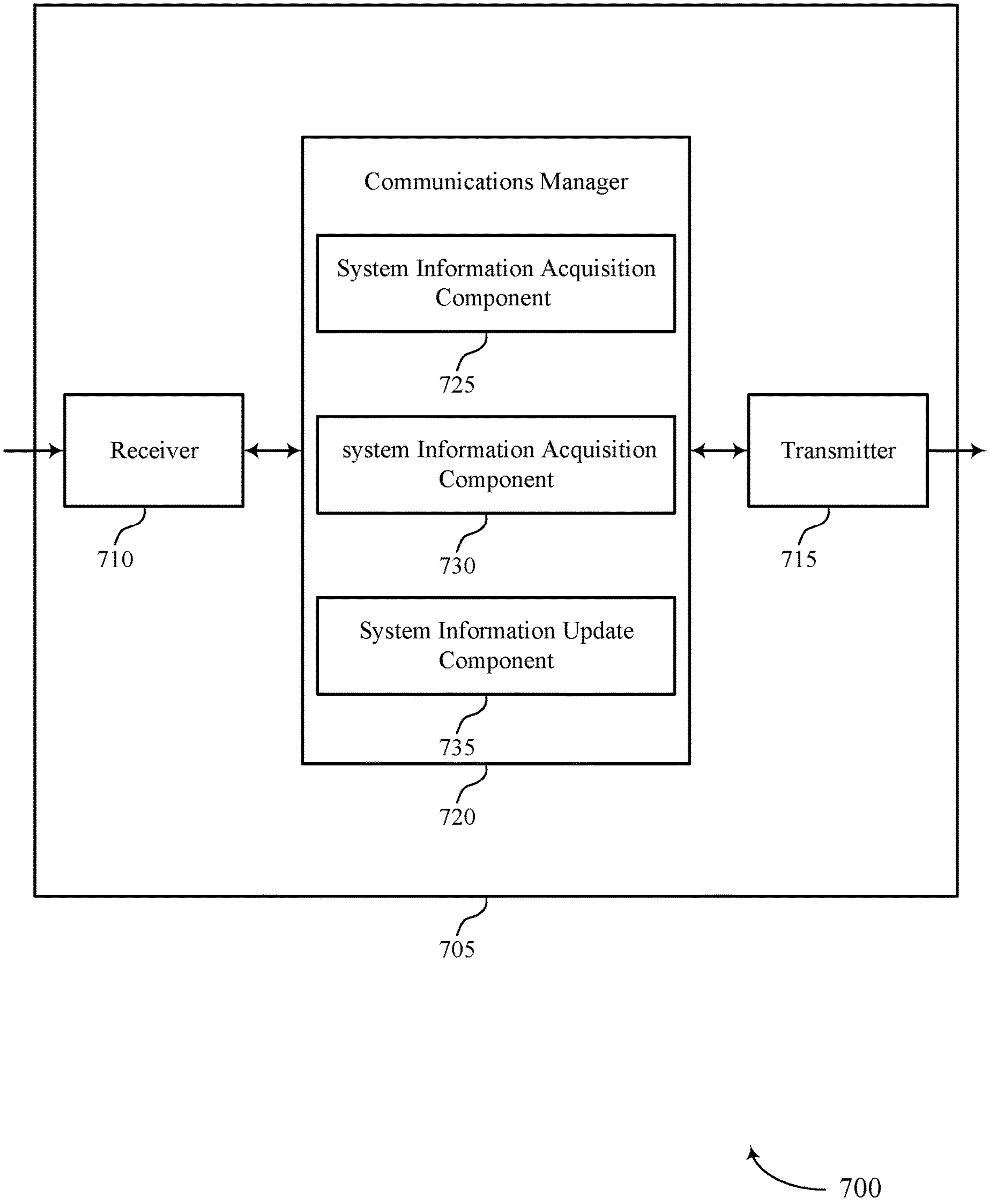

FIG. 7 shows a block diagram 700 of a device 705 that supports techniques for acquiring valid system information in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for acquiring valid system information). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for acquiring valid system information). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for acquiring valid system information as described herein. For example, the communications manager 720 may include a system information acquisition component 725, a system information acquisition component 730, a system information update component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The system information acquisition component 725 is capable of, configured to, or operable to support a means for receiving a first system information message that indicates a first system information type of a set of multiple system information types of a first cell, where the first system information type includes a set of system configuration parameters associated with the first cell. The system information acquisition component 730 is capable of, configured to, or operable to support a means for receiving, via a second cell that is different from the first cell, an indication of at least one change to the first system information type of the first cell. The system information update component 735 is capable of, configured to, or operable to support a means for receiving, via the first cell, an updated version of the first system information type based on the indication of the at least one change to the first system information type.

Figure 8:
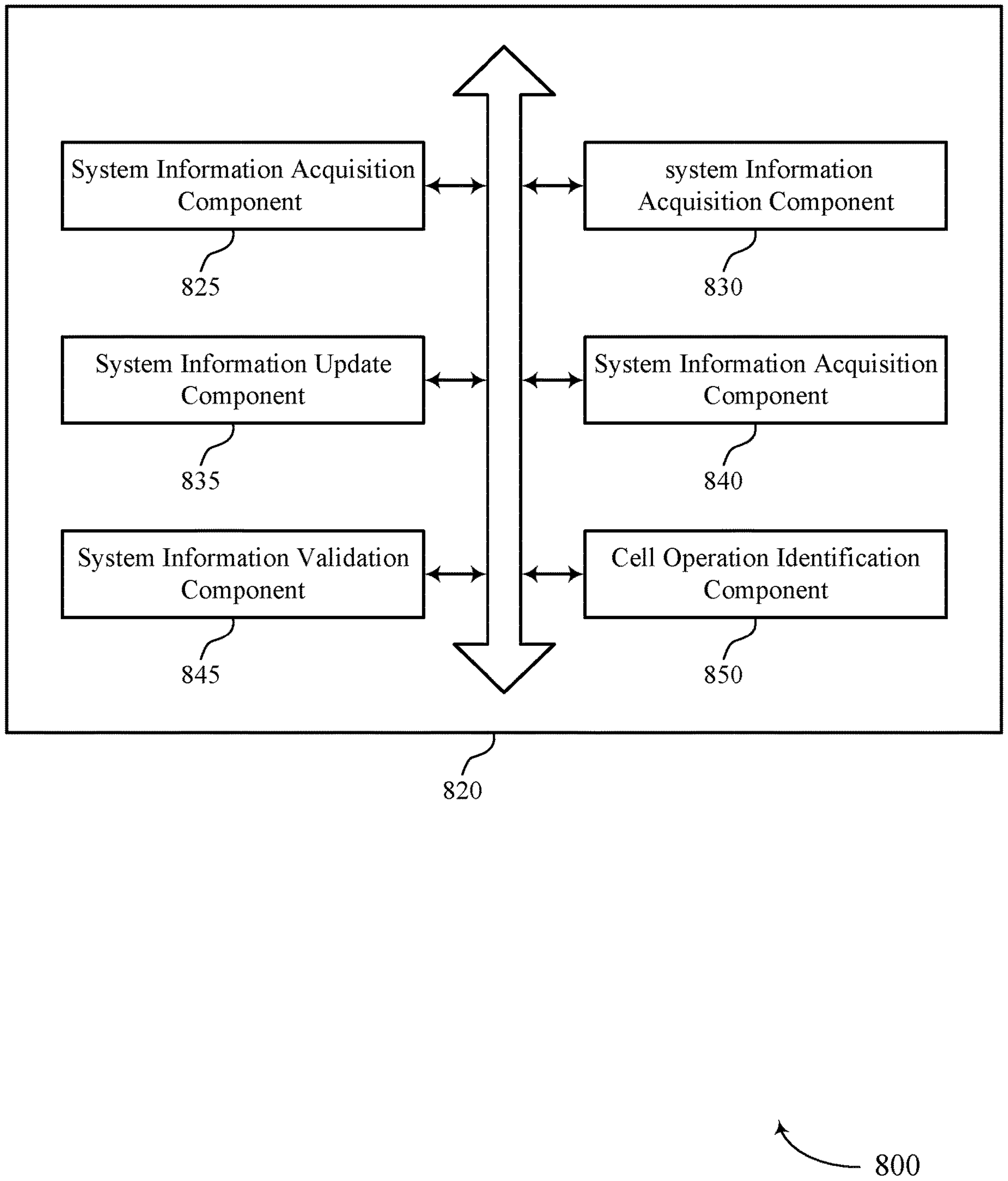
FIG. 8 shows a block diagram of a communications manager that supports techniques for acquiring valid system information in accordance with one or more aspects of the present disclosure.

FIG. 8 shows a block diagram 800 of a communications manager 820 that supports techniques for acquiring valid system information in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for acquiring valid system information as described herein. For example, the communications manager 820 may include a system information acquisition component 825, a system information acquisition component 830, a system information update component 835, a system information acquisition component 840, a system information validation component 845, a cell operation identification component 850, or any combination thereof. Each of these components, or components or sub-components thereof (e.g., one or more processors, one or more memories), may communicate, directly or indirectly, with one another (e.g., via one or more buses).

The communications manager 820 may support wireless communications in accordance with examples as disclosed herein. The system information acquisition component 825 is capable of, configured to, or operable to support a means for receiving a first system information message that indicates a first system information type of a set of multiple system information types of a first cell, where the first system information type includes a set of system configuration parameters associated with the first cell. The system information acquisition component 830 is capable of, configured to, or operable to support a means for receiving, via a second cell that is different from the first cell, an indication of at least one change to the first system information type of the first cell. The system information update component 835 is capable of, configured to, or operable to support a means for receiving, via the first cell, an updated version of the first system information type based on the indication of the at least one change to the first system information type.

In some examples, to support receiving the first system information message, the system information acquisition component 840 is capable of, configured to, or operable to support a means for receiving one or more second system information messages that indicate the first system information type, where the one or more second system information messages are received in accordance with a periodicity, are received in response to one or more system information update requests from the UE, or both.

In some examples, to support receiving the indication of the at least one change to the first system information type of the first cell, the system information update component 835 is capable of, configured to, or operable to support a means for receiving the indication of the at least one change to the first system information type via a second system information message associated with the second cell.

In some examples, the second system information message is indicative of the first cell operating in accordance with a first mode of operation, a set of neighboring cells operating in accordance with the first mode of operation, or both.

In some examples, the first mode of operation includes a network energy saving mode of operation, an on-demand system information transmission mode of operation, or both.

In some examples, the second system information message indicates one or more updates to system information for one or more cells of a set of multiple cells. In some examples, the set of multiple cells includes at least the first cell.

In some examples, the system information validation component 845 is capable of, configured to, or operable to support a means for evaluating a validity of the first system information type based on the second system information message, where the second system information message includes an assistance information message that includes information associated with the first cell.

In some examples, to support receiving the indication of the at least one change to the first system information type of the first cell, the system information acquisition component 840 is capable of, configured to, or operable to support a means for receiving, via the second cell, the indication of the at least one change to the first system information type via a downlink channel, a downlink control information message, or both.

In some examples, to support receiving the indication of the at least one change to the first system information type via the downlink channel, the system information update component 835 is capable of, configured to, or operable to support a means for receiving the indication of the at least one change to the first system information type via one or more scheduling paging messages of the downlink channel, one or more system information modification messages of the downlink channel, or both.

In some examples, to support receiving the indication of the at least one change to the first system information type via the downlink channel, the cell operation identification component 850 is capable of, configured to, or operable to support a means for receiving an indication of a radio network temporary identifier via the downlink channel, where the RNTI is indicative of a mode of operation of the first cell, a cell type of the first cell, or both.

In some examples, to support receiving the updated version of the first system information type, the system information validation component 845 is capable of, configured to, or operable to support a means for receiving, at a first time, a first indication of a version identifier associated with the first system information type of the first cell. In some examples, to support receiving the updated version of the first system information type, the system information validation component 845 is capable of, configured to, or operable to support a means for receiving, at a second time subsequent to the first time, a second indication of the version identifier associated with the first system information type of the first cell. In some examples, to support receiving the updated version of the first system information type, the system information validation component 845 is capable of, configured to, or operable to support a means for receiving, via the first cell, the updated version of the first system information type based on the first indication of the version identifier being different from the second indication of the version identifier.

In some examples, to support receiving the updated version of the first system information type, the system information update component 835 is capable of, configured to, or operable to support a means for receiving an indication of an update time that the updated version of the first system information type is created. In some examples, to support receiving the updated version of the first system information type, the system information update component 835 is capable of, configured to, or operable to support a means for receiving the updated version of the first system information type based on the first system information type being created at a time that precedes the update time.

In some examples, to support receiving the updated version of the first system information type, the system information update component 835 is capable of, configured to, or operable to support a means for receiving an indication of a modification period associated with the first system information type, where the at least one change to the first system information type occurs during the modification period. In some examples, to support receiving the updated version of the first system information type, the system information update component 835 is capable of, configured to, or operable to support a means for receiving the updated version of the first system information type based on the modification period being elapsed.

In some examples, to support receiving the updated version of the first system information type, the system information validation component 845 is capable of, configured to, or operable to support a means for performing one or more initial access procedures to obtain access to the first cell. In some examples, to support receiving the updated version of the first system information type, the system information validation component 845 is capable of, configured to, or operable to support a means for receiving the updated version of the first system information type based on the first system information type being invalid during the one or more initial access procedures.

In some examples, to support receiving the first system information message that indicates the first system information type, the system information acquisition component 840 is capable of, configured to, or operable to support a means for receiving the first system information message via a master information block of the first cell, via a paging downlink control channel of the first cell, via an RMSI scheduling downlink control channel of the first cell, via one or more other downlink control channels associated with the first cell, or any combination thereof.

In some examples, the first system information message includes assistance information that is indicative of one or more retransmissions of the first system information message that includes the first system information type.

In some examples, the system information update component 835 is capable of, configured to, or operable to support a means for transmitting one or more messages that request one or more retransmissions of the first system information message that includes the first system information type, where the first system information message includes assistance information that instructs the UE to request the one or more retransmissions of the first system information message.

In some examples, the first system information type includes RMSI or other system information that is different from the RMSI.

In some examples, the first cell includes a network energy savings capable cell, and the second cell includes an anchor cell.

Figure 9:
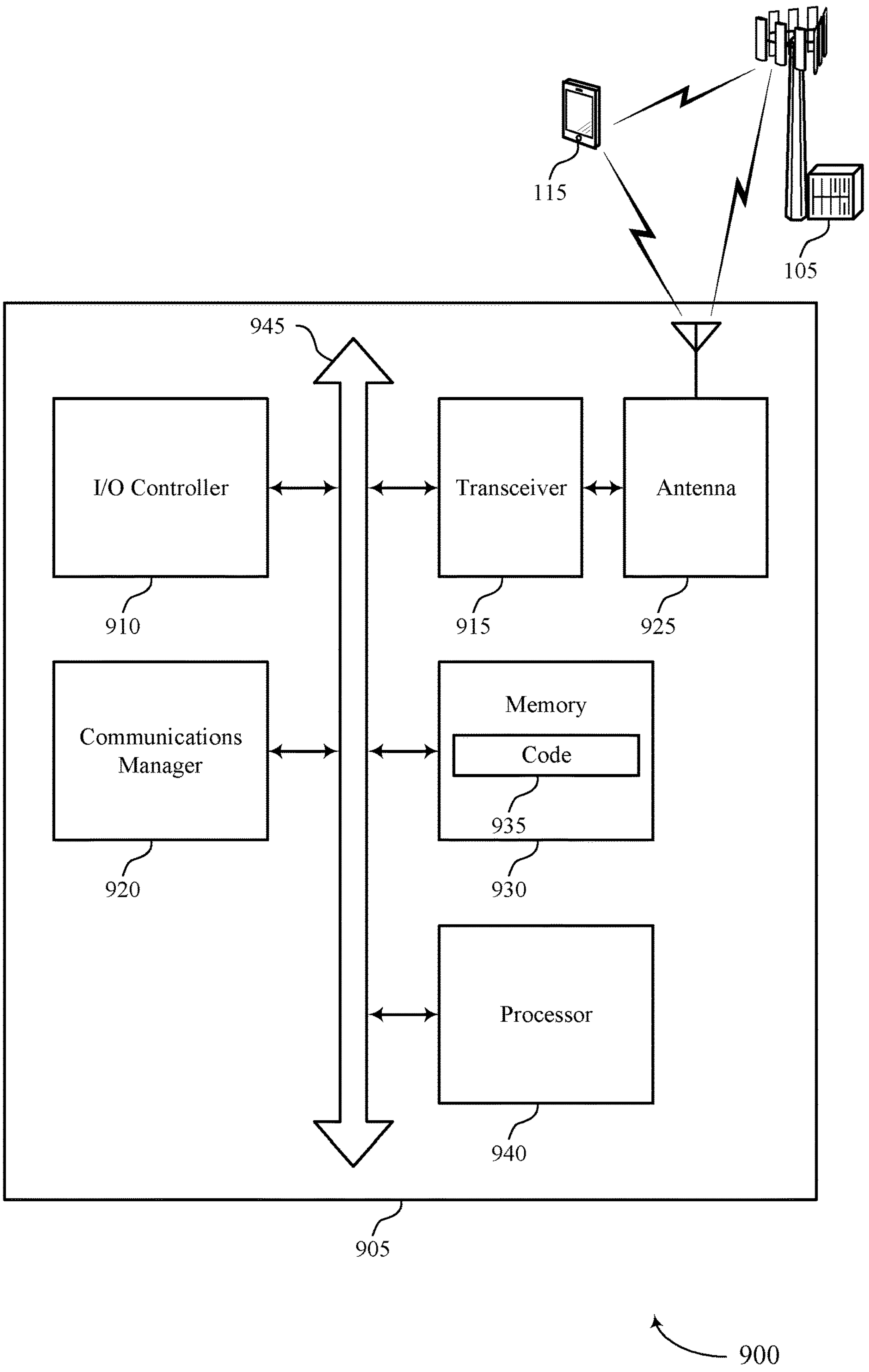
FIG. 9 shows a diagram of a system including a device that supports techniques for acquiring valid system information in accordance with one or more aspects of the present disclosure.

FIG. 9 shows a diagram of a system 900 including a device 905 that supports techniques for acquiring valid system information in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for acquiring valid system information). For example, the device 905 or a component of the device 905 may include at least one processor 940 and at least one memory 930 coupled with or to the at least one processor 940, the at least one processor 940 and the at least one memory 930 configured to perform various functions described herein.

In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving a first system information message that indicates a first system information type of a set of multiple system information types of a first cell, where the first system information type includes a set of system configuration parameters associated with the first cell. The communications manager 920 is capable of, configured to, or operable to support a means for receiving, via a second cell that is different from the first cell, an indication of at least one change to the first system information type of the first cell. The communications manager 920 is capable of, configured to, or operable to support a means for receiving, via the first cell, an updated version of the first system information type based on the indication of the at least one change to the first system information type.

By including or configuring the communications manager 920 in accordance with examples as described herein, the device 905 may support techniques for improved communication reliability due to reduced initial access failure, reduced latency, improved user experience related to reduced processing, reduced power consumption, more efficient utilization of communication resources, improved coordination between devices, longer battery life, improved utilization of processing capability, reduced signaling overhead, more accurate stored system information, increased efficiency for cellular initial access, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for acquiring valid system information as described herein, or the at least one processor 940 and the at least one memory 930 may be otherwise configured to, individually or collectively, perform or support such operations.

Figure 10:
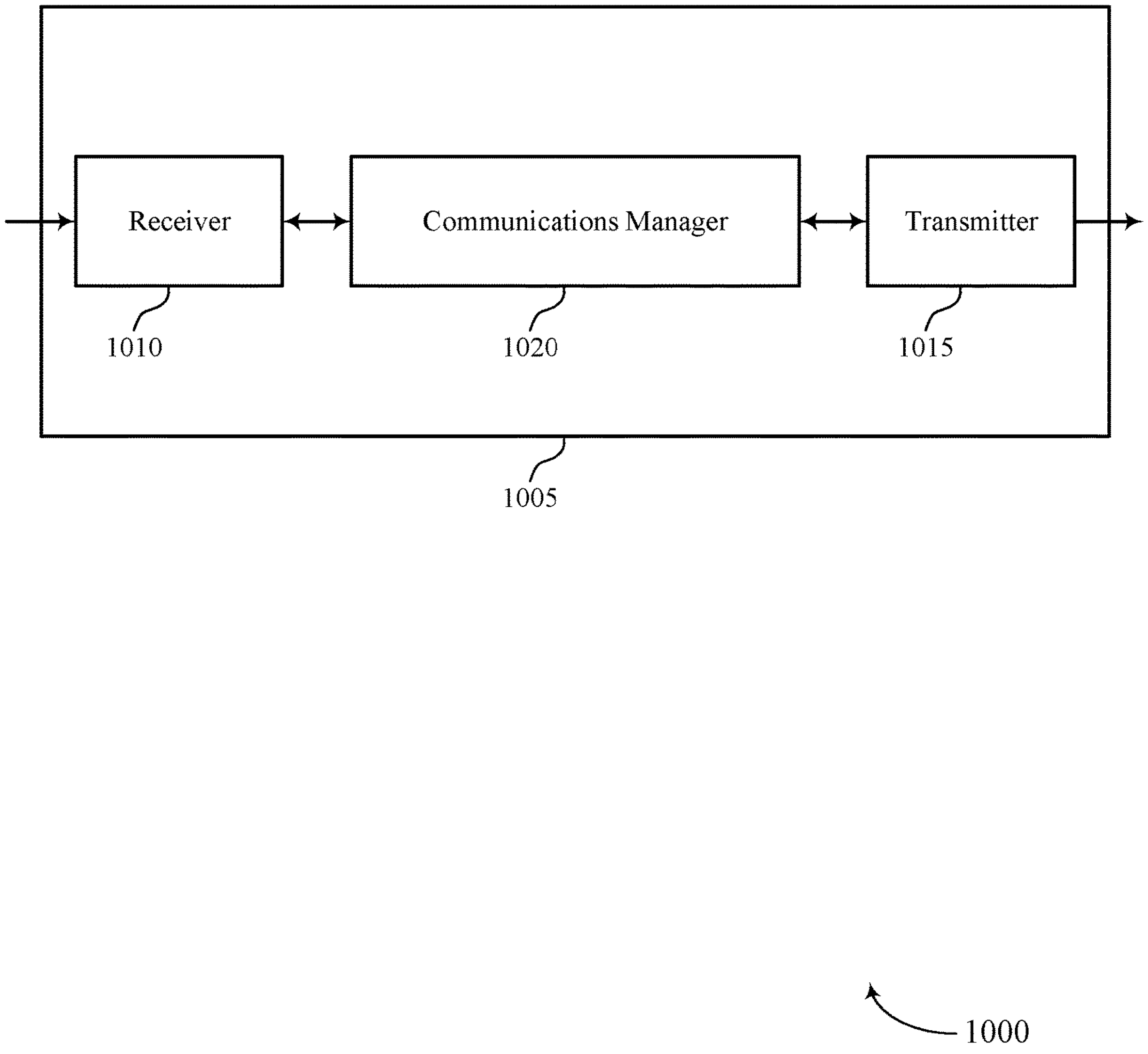
FIGS. 10 and 11 show block diagrams of devices that support techniques for acquiring valid system information in accordance with one or more aspects of the present disclosure.

FIG. 10 shows a block diagram 1000 of a device 1005 that supports techniques for acquiring valid system information in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of techniques for acquiring valid system information as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for obtaining information indicative of at least one change of a first system information type of a set of multiple system information types of a first cell, where the first cell is different from a second cell associated with the network entity and includes a set of system configuration parameters associated with the first cell. The communications manager 1020 is capable of, configured to, or operable to support a means for outputting, to a UE associated with the second cell, an indication of the at least one change to the first system information type of the first cell.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, more efficient utilization of communication resources, reduced signaling overhead, improved cell acquisition, increased efficiency for initial access, among other advantages.

Figure 11:
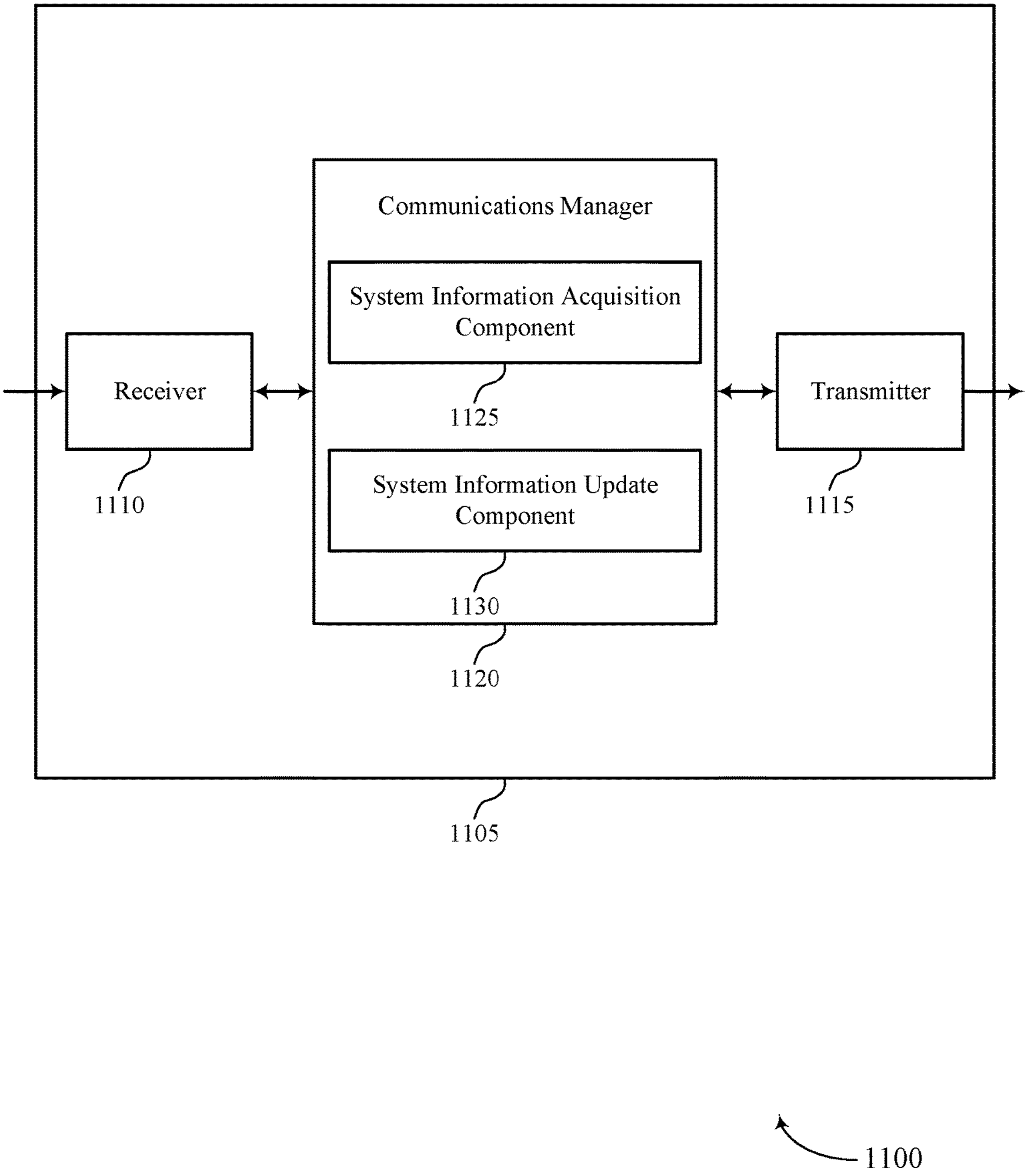

FIG. 11 shows a block diagram 1100 of a device 1105 that supports techniques for acquiring valid system information in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for acquiring valid system information as described herein. For example, the communications manager 1120 may include a system information acquisition component 1125 a system information update component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The system information acquisition component 1125 is capable of, configured to, or operable to support a means for obtaining information indicative of at least one change of a first system information type of a set of multiple system information types of a first cell, where the first cell is different from a second cell associated with the network entity and includes a set of system configuration parameters associated with the first cell. The system information update component 1130 is capable of, configured to, or operable to support a means for outputting, to a UE associated with the second cell, an indication of the at least one change to the first system information type of the first cell.

Figure 12:
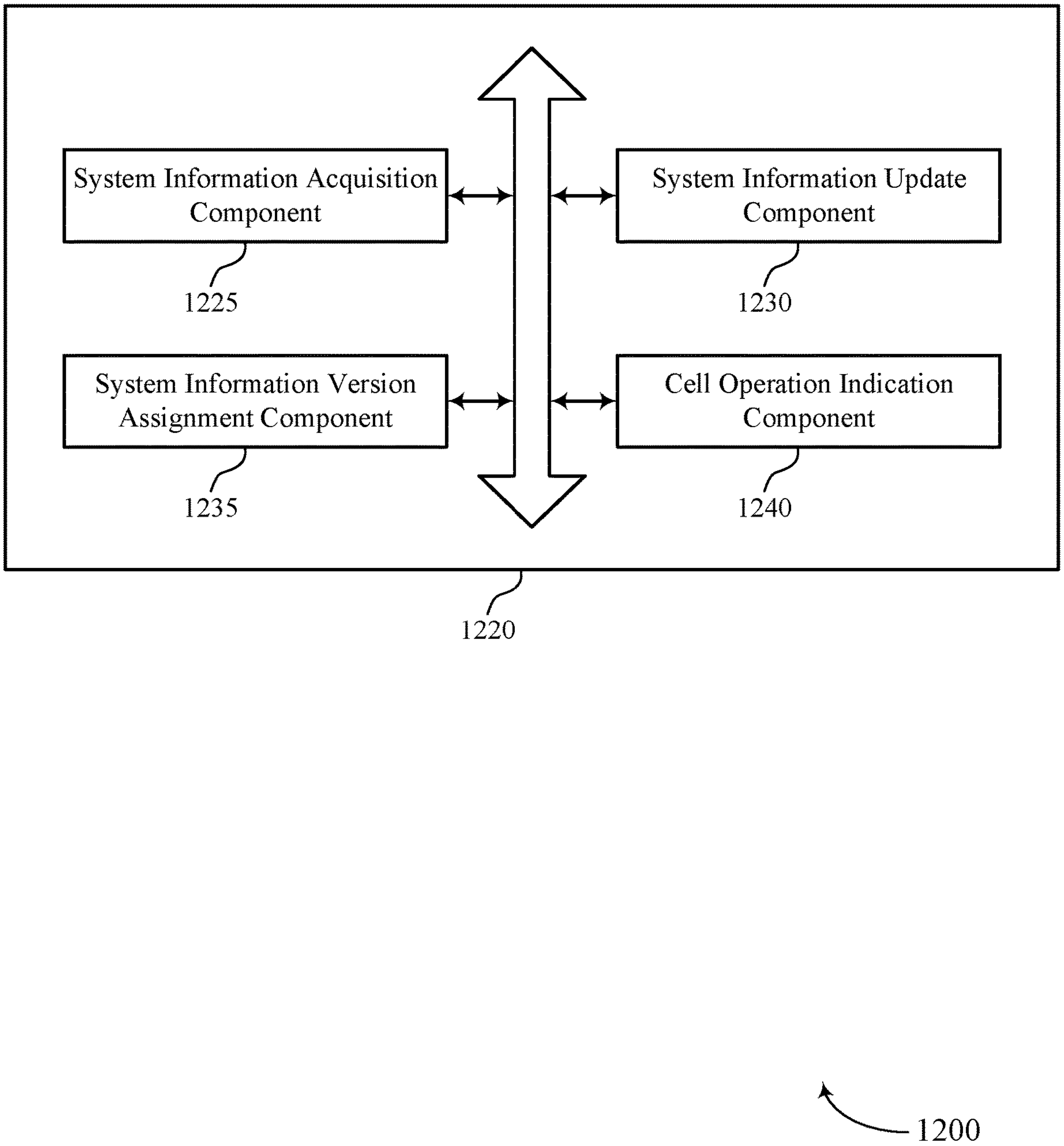
FIG. 12 shows a block diagram of a communications manager that supports techniques for acquiring valid system information in accordance with one or more aspects of the present disclosure.

FIG. 12 shows a block diagram 1200 of a communications manager 1220 that supports techniques for acquiring valid system information in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for acquiring valid system information as described herein. For example, the communications manager 1220 may include a system information acquisition component 1225, a system information update component 1230, a system information version assignment component 1235, a cell operation indication component 1240, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The system information acquisition component 1225 is capable of, configured to, or operable to support a means for obtaining information indicative of at least one change of a first system information type of a set of multiple system information types of a first cell, where the first cell is different from a second cell associated with the network entity and includes a set of system configuration parameters associated with the first cell. The system information update component 1230 is capable of, configured to, or operable to support a means for outputting, to a UE associated with the second cell, an indication of the at least one change to the first system information type of the first cell.

In some examples, to support outputting the information indicative of the at least one change to the first system information type of the first cell, the system information update component 1230 is capable of, configured to, or operable to support a means for outputting the indication of the at least one change to the first system information type via a second system information message associated with the second cell.

In some examples, the second system information message is indicative of the first cell operating in accordance with a first mode of operation, a set of neighboring cells operating in accordance with the first mode of operation, or both. In some examples, the first mode of operation includes a network energy saving mode of operation, an on-demand system information transmission mode of operation, or both.

In some examples, the second system information message indicates one or more updates to system information for one or more cells of a set of multiple cells. In some examples, the set of multiple cells includes at least the first cell. In some examples, the second system information message includes an assistance information message that includes information associated with a validity of the first system information type of the first cell.

In some examples, to support outputting the information indicative of the at least one change to the first system information type of the first cell, the system information update component 1230 is capable of, configured to, or operable to support a means for outputting the indication of the at least one change to the first system information type via a downlink channel, a downlink control information message, or both.

In some examples, to support outputting the information indicative of the at least one change to the first system information type via the downlink channel, the system information update component 1230 is capable of, configured to, or operable to support a means for outputting the indication of the at least one change to the first system information type via one or more scheduling paging messages of the downlink channel, one or more system information modification messages of the downlink channel, or both.

In some examples, to support outputting the information indicative of the at least one change to the first system information type via the downlink channel, the cell operation indication component 1240 is capable of, configured to, or operable to support a means for outputting an indication of a RNTI via the downlink channel, where the RNTI is indicative of a mode of operation of the first cell, a cell type of the first cell, or both.

In some examples, to support outputting the information indicative of the at least one change to the first system information type, the system information version assignment component 1235 is capable of, configured to, or operable to support a means for outputting, at a first time, a first indication of a version identifier associated with the first system information type of the first cell. In some examples, to support outputting the information indicative of the at least one change to the first system information type, the system information version assignment component 1235 is capable of, configured to, or operable to support a means for outputting, at a second time subsequent to the first time, a second indication of the version identifier associated with the first system information type of the first cell.

In some examples, to support outputting the information indicative of the at least one change to the first system information type, the system information version assignment component 1235 is capable of, configured to, or operable to support a means for outputting an indication of an update time that an updated version of the first system information type is created.

In some examples, to support outputting the information indicative of the at least one change to the first system information type, the system information update component 1230 is capable of, configured to, or operable to support a means for outputting an indication of a modification period associated with the first system information type, where the at least one change to the first system information type occurs during the modification period. In some examples, the first system information type includes RMSI or other system information that is different from the RMSI. In some examples, the first cell includes a network energy savings capable cell, and the second cell includes an anchor cell.

Figure 13:
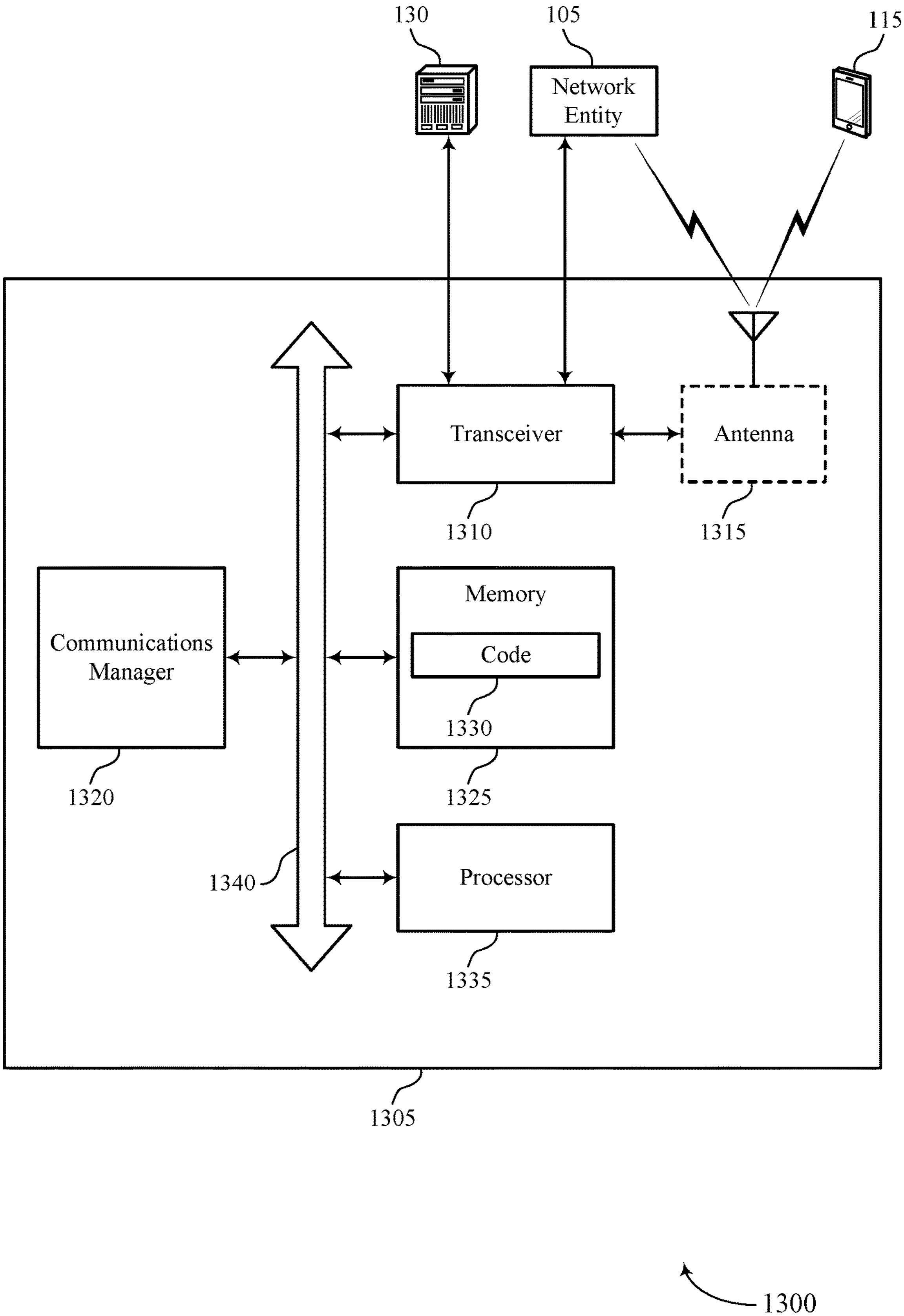
FIG. 13 shows a diagram of a system including a device that supports techniques for acquiring valid system information in accordance with one or more aspects of the present disclosure.

FIG. 13 shows a diagram of a system 1300 including a device 1305 that supports techniques for acquiring valid system information in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for acquiring valid system information). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325).

In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for obtaining information indicative of at least one change of a first system information type of a set of multiple system information types of a first cell, where the first cell is different from a second cell associated with the network entity and includes a set of system configuration parameters associated with the first cell. The communications manager 1320 is capable of, configured to, or operable to support a means for outputting, to a UE associated with the second cell, an indication of the at least one change to the first system information type of the first cell.

By including or configuring the communications manager 1320 in accordance with examples as described herein, the device 1305 may support techniques for improved communication reliability due to reduced initial access failure, reduced latency, improved user experience related to reduced processing, reduced power consumption, more efficient utilization of communication resources, improved coordination between devices, longer battery life, improved utilization of processing capability, reduced signaling overhead, more accurate stored system information, increased efficiency for cellular initial access, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for acquiring valid system information as described herein, or the at least one processor 1335 and the at least one memory 1325 may be otherwise configured to, individually or collectively, perform or support such operations.

Figure 14:
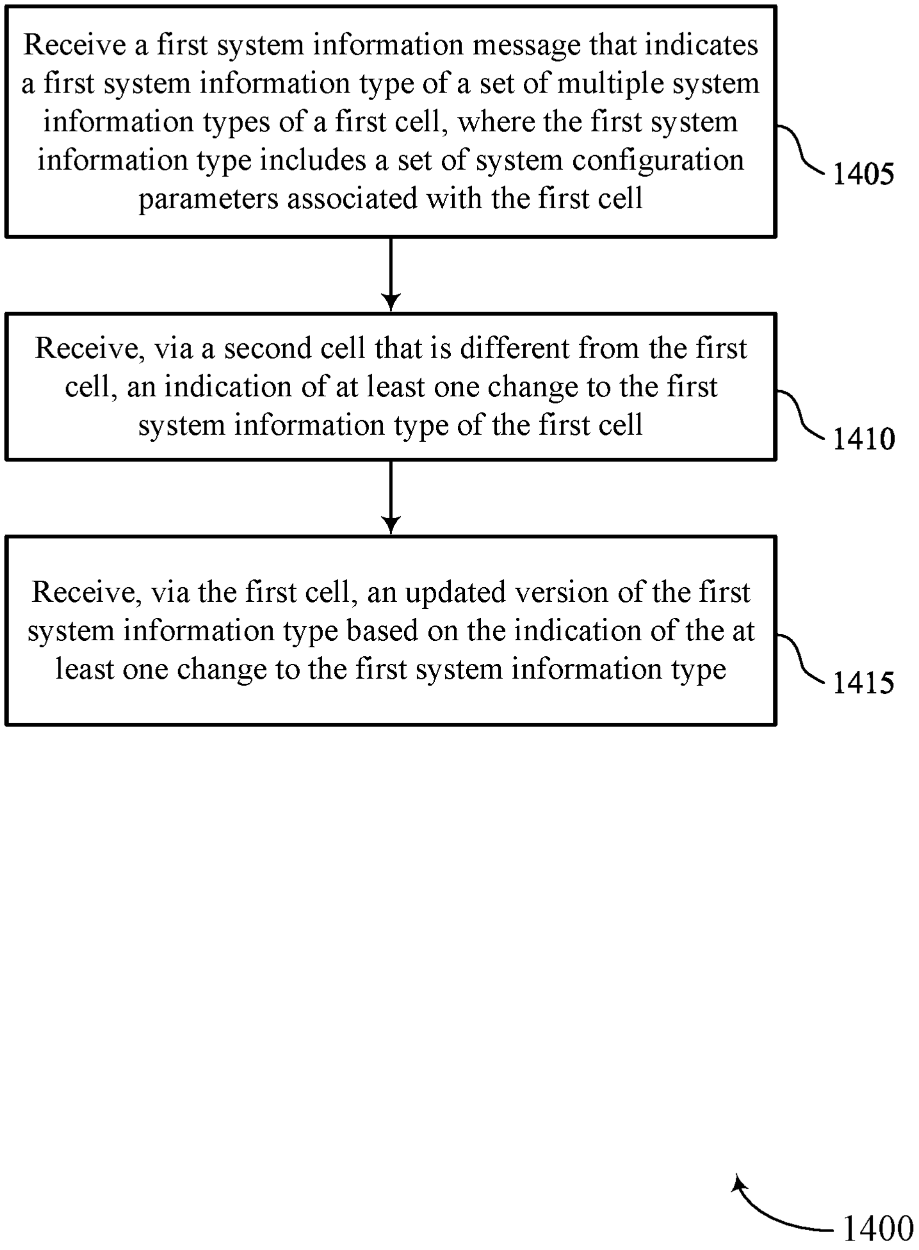
FIGS. 14 through 17 show flowcharts illustrating methods that support techniques for acquiring valid system information in accordance with one or more aspects of the present disclosure.

FIG. 14 shows a flowchart illustrating a method 1400 that supports techniques for acquiring valid system information in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first system information message that indicates a first system information type of a set of multiple system information types of a first cell, where the first system information type includes a set of system configuration parameters associated with the first cell. The operations of 1405 may be performed in accordance with examples as disclosed herein. In some examples, aspects of the operations of 1405 may be performed by a system information acquisition component 825 as described with reference to FIG. 8.

At 1410, the method may include receiving, via a second cell that is different from the first cell, an indication of at least one change to the first system information type of the first cell. The operations of 1410 may be performed in accordance with examples as disclosed herein. In some examples, aspects of the operations of 1410 may be performed by a system information acquisition component 830 as described with reference to FIG. 8.

At 1415, the method may include receiving, via the first cell, an updated version of the first system information type based on the indication of the at least one change to the first system information type. The operations of 1415 may be performed in accordance with examples as disclosed herein. In some examples, aspects of the operations of 1415 may be performed by a system information update component 835 as described with reference to FIG. 8.

Figure 15:
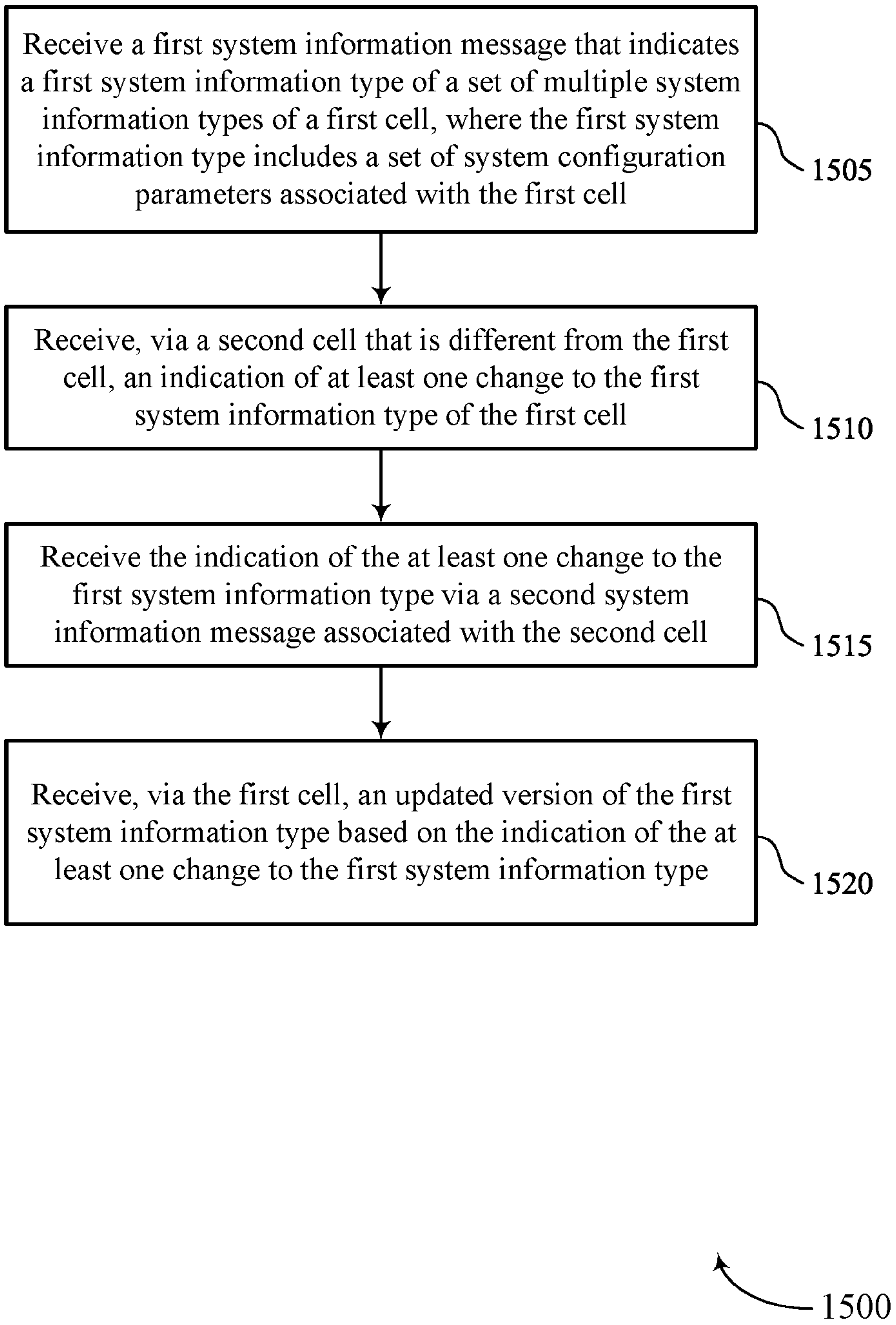

FIG. 15 shows a flowchart illustrating a method 1500 that supports techniques for acquiring valid system information in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first system information message that indicates a first system information type of a set of multiple system information types of a first cell, where the first system information type includes a set of system configuration parameters associated with the first cell. The operations of 1505 may be performed in accordance with examples as disclosed herein. In some examples, aspects of the operations of 1505 may be performed by a system information acquisition component 825 as described with reference to FIG. 8.

At 1510, the method may include receiving, via a second cell that is different from the first cell, an indication of at least one change to the first system information type of the first cell. The operations of 1510 may be performed in accordance with examples as disclosed herein. In some examples, aspects of the operations of 1510 may be performed by a system information acquisition component 830 as described with reference to FIG. 8.

At 1515, the method may include receiving the indication of the at least one change to the first system information type via a second system information message associated with the second cell. The operations of 1515 may be performed in accordance with examples as disclosed herein. In some examples, aspects of the operations of 1515 may be performed by a system information update component 835 as described with reference to FIG. 8.

At 1520, the method may include receiving, via the first cell, an updated version of the first system information type based on the indication of the at least one change to the first system information type. The operations of 1520 may be performed in accordance with examples as disclosed herein. In some examples, aspects of the operations of 1520 may be performed by a system information update component 835 as described with reference to FIG. 8.

Figure 16:
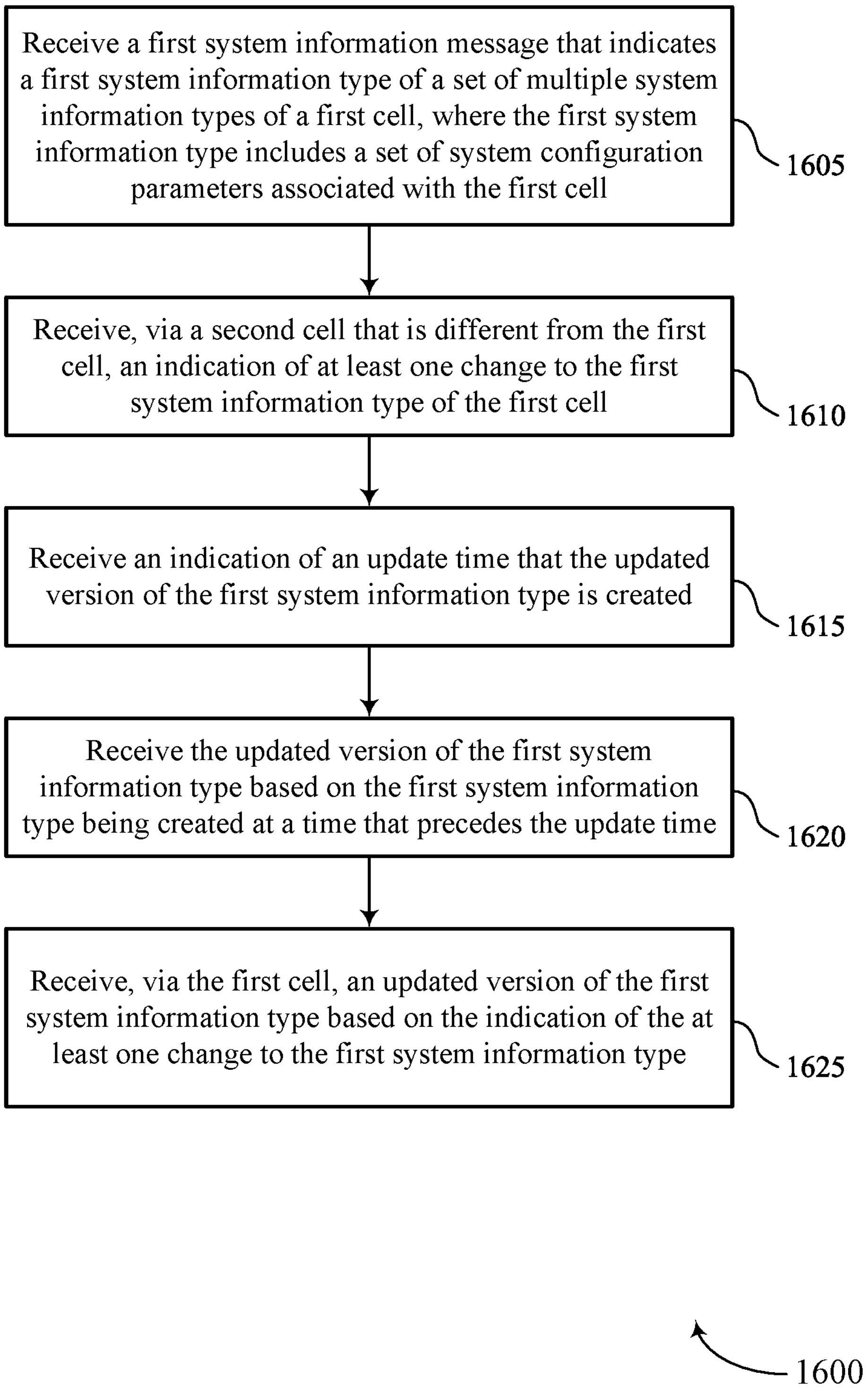

FIG. 16 shows a flowchart illustrating a method 1600 that supports techniques for acquiring valid system information in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first system information message that indicates a first system information type of a set of multiple system information types of a first cell, where the first system information type includes a set of system configuration parameters associated with the first cell. The operations of 1605 may be performed in accordance with examples as disclosed herein. In some examples, aspects of the operations of 1605 may be performed by a system information acquisition component 825 as described with reference to FIG. 8.

At 1610, the method may include receiving, via a second cell that is different from the first cell, an indication of at least one change to the first system information type of the first cell. The operations of 1610 may be performed in accordance with examples as disclosed herein. In some examples, aspects of the operations of 1610 may be performed by a system information acquisition component 830 as described with reference to FIG. 8.

At 1615, the method may include receiving an indication of an update time that the updated version of the first system information type is created. The operations of 1615 may be performed in accordance with examples as disclosed herein. In some examples, aspects of the operations of 1615 may be performed by a system information update component 835 as described with reference to FIG. 8.

At 1620, the method may include receiving the updated version of the first system information type based on the first system information type being created at a time that precedes the update time. The operations of 1620 may be performed in accordance with examples as disclosed herein. In some examples, aspects of the operations of 1620 may be performed by a system information update component 835 as described with reference to FIG. 8.

At 1625, the method may include receiving, via the first cell, an updated version of the first system information type based on the indication of the at least one change to the first system information type. The operations of 1625 may be performed in accordance with examples as disclosed herein. In some examples, aspects of the operations of 1625 may be performed by a system information update component 835 as described with reference to FIG. 8.

Figure 17:
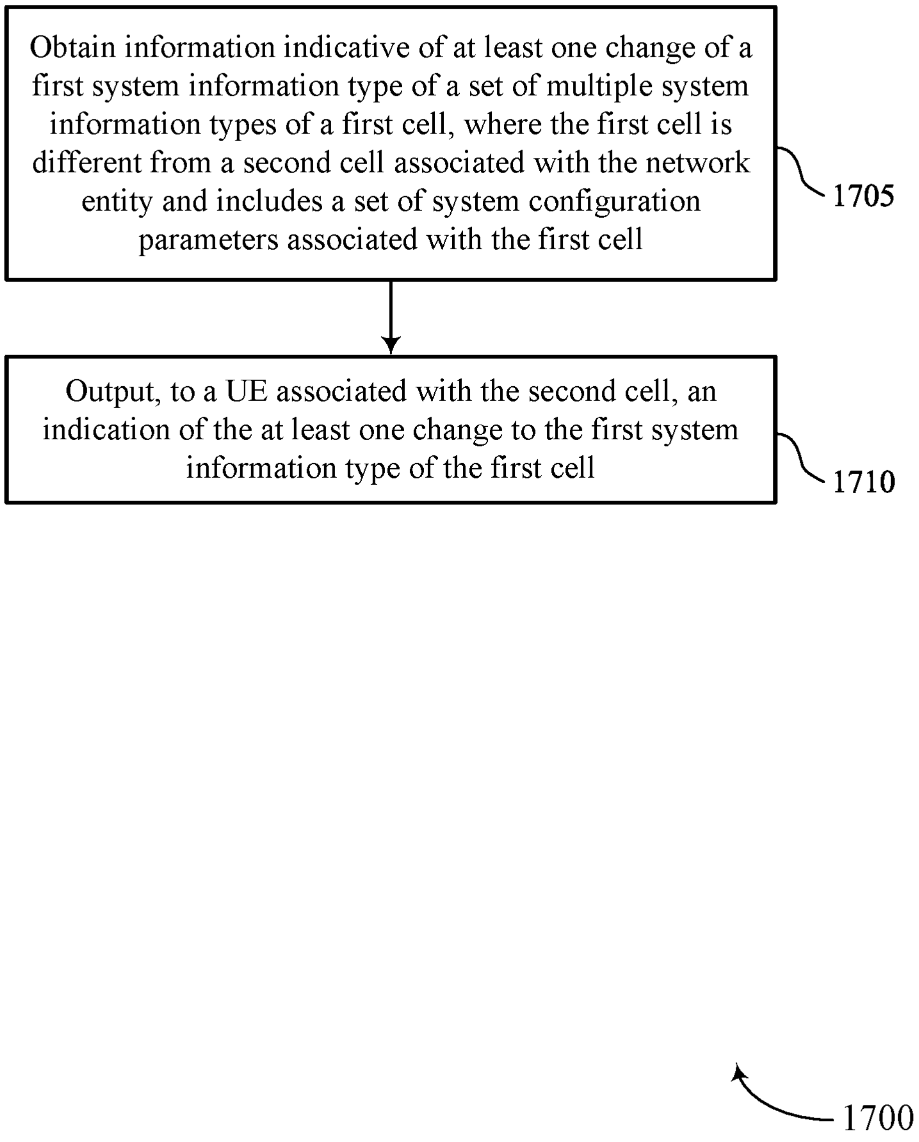

FIG. 17 shows a flowchart illustrating a method 1700 that supports techniques for acquiring valid system information in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include obtaining information indicative of at least one change of a first system information type of a set of multiple system information types of a first cell, where the first cell is different from a second cell associated with the network entity and includes a set of system configuration parameters associated with the first cell. The operations of 1705 may be performed in accordance with examples as disclosed herein. In some examples, aspects of the operations of 1705 may be performed by a system information acquisition component 1225 as described with reference to FIG. 12.

At 1710, the method may include outputting, to a UE associated with the second cell, an indication of the at least one change to the first system information type of the first cell. The operations of 1710 may be performed in accordance with examples as disclosed herein. In some examples, aspects of the operations of 1710 may be performed by a system information update component 1230 as described with reference to FIG. 12.

The following provides an overview of aspects of the present disclosure:

Aspect 1: A method for wireless communications at a UE, comprising: receiving a first system information message that indicates a first system information type of a plurality of system information types of a first cell, wherein the first system information type comprises a set of system configuration parameters associated with the first cell; receiving, via a second cell that is different from the first cell, an indication of at least one change to the first system information type of the first cell; and receiving, via the first cell, an updated version of the first system information type based at least in part on the indication of the at least one change to the first system information type.

Aspect 2: The method of aspect 1, wherein receiving the first system information message comprises: receiving one or more second system information messages that indicate the first system information type, wherein the one or more second system information messages are received in accordance with a periodicity, are received in response to one or more system information update requests from the UE, or both.

Aspect 3: The method of any of aspects 1 through 2, wherein receiving the indication of the at least one change to the first system information type of the first cell comprises: receiving the indication of the at least one change to the first system information type via a second system information message associated with the second cell.

Aspect 4: The method of aspect 3, wherein the second system information message is indicative of the first cell operating in accordance with a first mode of operation, a set of neighboring cells operating in accordance with the first mode of operation, or both.

Aspect 5: The method of aspect 4, wherein the first mode of operation comprises a network energy saving mode of operation, an on-demand system information transmission mode of operation, or both.

Aspect 6: The method of any of aspects 3 through 5, wherein the second system information message indicates one or more updates to system information for one or more cells of a plurality of cells, the plurality of cells includes at least the first cell.

Aspect 7: The method of any of aspects 3 through 6, further comprising: evaluating a validity of the first system information type based at least in part on the second system information message, wherein the second system information message comprises an assistance information message that includes information associated with the first cell.

Aspect 8: The method of any of aspects 1 through 7, wherein receiving the indication of the at least one change to the first system information type of the first cell comprises: receiving, via the second cell, the indication of the at least one change to the first system information type via a downlink channel, a DCI message, or both.

Aspect 9: The method of aspect 8, wherein receiving the indication of the at least one change to the first system information type via the downlink channel comprises: receiving the indication of the at least one change to the first system information type via one or more scheduling paging messages of the downlink channel, one or more system information modification messages of the downlink channel, or both.

Aspect 10: The method of any of aspects 8 through 9, wherein receiving the indication of the at least one change to the first system information type via the downlink channel comprises: receiving an indication of an RNTI via the downlink channel, wherein the RNTI is indicative of a mode of operation of the first cell, a cell type of the first cell, or both.

Aspect 11: The method of any of aspects 1 through 10, wherein receiving the updated version of the first system information type comprises: receiving, at a first time, a first indication of a version ID associated with the first system information type of the first cell; receiving, at a second time subsequent to the first time, a second indication of the version ID associated with the first system information type of the first cell; and receiving, via the first cell, the updated version of the first system information type based at least in part on the first indication of the version ID being different from the second indication of the version ID.

Aspect 12: The method of any of aspects 1 through 11, wherein receiving the updated version of the first system information type comprises: receiving an indication of an update time that the updated version of the first system information type is created; and receiving the updated version of the first system information type based at least in part on the first system information type being created at a time that precedes the update time.

Aspect 13: The method of any of aspects 1 through 12, wherein receiving the updated version of the first system information type comprises: receiving an indication of a modification period associated with the first system information type, wherein the at least one change to the first system information type occurs during the modification period; and receiving the updated version of the first system information type based at least in part on the modification period being elapsed.

Aspect 14: The method of any of aspects 1 through 13, wherein receiving the updated version of the first system information type comprises: performing one or more initial access procedures to obtain access to the first cell; and receiving the updated version of the first system information type based at least in part on the first system information type being invalid during the one or more initial access procedures.

Aspect 15: The method of any of aspects 1 through 14, wherein the first cell and the second cell comprise a same cell, and wherein receiving the first system information message that indicates the first system information type comprises: receiving the first system information message via a MIB of the first cell, via a paging downlink control channel of the first cell, via an RMSI scheduling downlink control channel of the first cell, via one or more other downlink control channels associated with the first cell, or any combination thereof.

Aspect 16: The method of any of aspects 1 through 15, wherein the first system information message includes assistance information that is indicative of one or more retransmissions of the first system information message that includes the first system information type.

Aspect 17: The method of any of aspects 1 through 16, further comprising: transmitting one or more messages that request one or more retransmissions of the first system information message that includes the first system information type, wherein the first system information message includes assistance information that instructs the UE to request the one or more retransmissions of the first system information message.

Aspect 18: The method of any of aspects 1 through 17, wherein the first system information type comprises RMSI or other system information that is different from the RMSI.

Aspect 19: The method of any of aspects 1 through 18, wherein the first cell comprises an NES capable cell, and the second cell comprises an anchor cell.

Aspect 20: A method for wireless communications at a network entity, comprising: obtaining information indicative of at least one change of a first system information type of a plurality of system information types of a first cell, wherein the first cell is different from a second cell associated with the network entity and comprises a set of system configuration parameters associated with the first cell; and outputting, to a UE associated with the second cell, an indication of the at least one change to the first system information type of the first cell.

Aspect 21: The method of aspect 20, wherein outputting the information indicative of the at least one change to the first system information type of the first cell comprises: outputting the indication of the at least one change to the first system information type via a second system information message associated with the second cell.

Aspect 22: The method of aspect 21, wherein the second system information message is indicative of the first cell operating in accordance with a first mode of operation, a set of neighboring cells operating in accordance with the first mode of operation, or both.

Aspect 23: The method of aspect 22, wherein the first mode of operation comprises an NES mode of operation, an on-demand system information transmission mode of operation, or both.

Aspect 24: The method of any of aspects 21 through 23, wherein the second system information message indicates one or more updates to system information for one or more cells of a plurality of cells, the plurality of cells includes at least the first cell.

Aspect 25: The method of any of aspects 21 through 24, wherein the second system information message comprises an assistance information message that includes information associated with a validity of the first system information type of the first cell.

Aspect 26: The method of any of aspects 20 through 25, wherein outputting the information indicative of the at least one change to the first system information type of the first cell comprises: outputting the indication of the at least one change to the first system information type via a downlink channel, a DCI message, or both.

Aspect 27: The method of aspect 26, wherein outputting the information indicative of the at least one change to the first system information type via the downlink channel comprises: outputting the indication of the at least one change to the first system information type via one or more scheduling paging messages of the downlink channel, one or more system information modification messages of the downlink channel, or both.

Aspect 28: The method of any of aspects 26 through 27, wherein outputting the information indicative of the at least one change to the first system information type via the downlink channel comprises: outputting an indication of an RNTI via the downlink channel, wherein the RNTI is indicative of a mode of operation of the first cell, a cell type of the first cell, or both.

Aspect 29: The method of any of aspects 20 through 28, wherein outputting the information indicative of the at least one change to the first system information type comprises: outputting, at a first time, a first indication of a version ID associated with the first system information type of the first cell; and outputting, at a second time subsequent to the first time, a second indication of the version ID associated with the first system information type of the first cell.

Aspect 30: The method of any of aspects 20 through 29, wherein outputting the information indicative of the at least one change to the first system information type comprises: outputting an indication of an update time that an updated version of the first system information type is created.

Aspect 31: The method of any of aspects 20 through 30, wherein outputting the information indicative of the at least one change to the first system information type comprises: outputting an indication of a modification period associated with the first system information type, wherein the at least one change to the first system information type occurs during the modification period.

Aspect 32: The method of any of aspects 20 through 31, wherein the first system information type comprises RMSI or other system information that is different from the RMSI.

Aspect 33: The method of any of aspects 20 through 32, wherein the first cell comprises a network energy savings capable cell, and the second cell comprises an anchor cell.

Aspect 34: A UE for wireless communications, comprising one or more memories storing processor-executable code, and one or more processors coupled with the one or more memories and individually or collectively operable to execute the code to cause the UE to perform a method of any of aspects 1 through 19.

Aspect 35: A UE for wireless communications, comprising at least one means for performing a method of any of aspects 1 through 19.

Aspect 36: A non-transitory computer-readable medium storing code for wireless communications, the code comprising instructions executable by one or more processors to perform a method of any of aspects 1 through 19.

Aspect 37: A network entity for wireless communications, comprising one or more memories storing processor-executable code, and one or more processors coupled with the one or more memories and individually or collectively operable to execute the code to cause the network entity to perform a method of any of aspects 20 through 33.

Aspect 38: A network entity for wireless communications, comprising at least one means for performing a method of any of aspects 20 through 33.

Aspect 39: A non-transitory computer-readable medium storing code for wireless communications, the code comprising instructions executable by one or more processors to perform a method of any of aspects 20 through 33.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first system information message that indicates a first system information type of a plurality of system information types of a first cell, wherein the first system information type comprises a set of system configuration parameters associated with the first cell;

receive, via a second cell that is different from the first cell, an indication of at least one change to the first system information type of the first cell; and receive, via the first cell, an updated version of the first system information type based at least in part on the indication of the at least one change to the first system information type.

2. The UE of claim 1, wherein, to receive the first system information message, the one or more processors are individually or collectively operable to execute the code to cause the UE to:

receive one or more second system information messages that indicate the first system information type, wherein the one or more second system information messages are received in accordance with a periodicity, are received in response to one or more system information update requests from the UE, or both.

3. The UE of claim 1, wherein, to receive the indication of the at least one change to the first system information type of the first cell, the one or more processors are individually or collectively operable to execute the code to cause the UE to:

receive the indication of the at least one change to the first system information type via a second system information message associated with the second cell.

4. The UE of claim 3, wherein the second system information message is indicative of the first cell operating in accordance with a first mode of operation, a set of neighboring cells operating in accordance with the first mode of operation, or both.

5. The UE of claim 4, wherein the first mode of operation comprises a network energy saving mode of operation, an on-demand system information transmission mode of operation, or both.

6. The UE of claim 3, wherein the second system information message indicates one or more updates to system information for one or more cells of a plurality of cells, and the plurality of cells includes at least the first cell.

7. The UE of claim 3, wherein the one or more processors are individually or collectively further operable to execute the code to cause the UE to:

evaluate a validity of the first system information type based at least in part on the second system information message, wherein the second system information message comprises an assistance information message that includes information associated with the first cell.

8. The UE of claim 1, wherein, to receive the indication of the at least one change to the first system information type of the first cell, the one or more processors are individually or collectively operable to execute the code to cause the UE to:

receive, via the second cell, the indication of the at least one change to the first system information type via a downlink channel, a downlink control information message, or both.

9. The UE of claim 8, wherein, to receive the indication of the at least one change to the first system information type via the downlink channel, the one or more processors are individually or collectively operable to execute the code to cause the UE to:

receive the indication of the at least one change to the first system information type via one or more scheduling paging messages of the downlink channel, one or more system information modification messages of the downlink channel, or both.

10. The UE of claim 8, wherein, to receive the indication of the at least one change to the first system information type via the downlink channel, the one or more processors are individually or collectively operable to execute the code to cause the UE to:

receive an indication of a radio network temporary identifier via the downlink channel, wherein the radio network temporary identifier is indicative of a mode of operation of the first cell, a cell type of the first cell, or both.

11. The UE of claim 1, wherein, to receive the updated version of the first system information type, the one or more processors are individually or collectively operable to execute the code to cause the UE to:

receive, at a first time, a first indication of a version identifier associated with the first system information type of the first cell;

receive, at a second time subsequent to the first time, a second indication of the version identifier associated with the first system information type of the first cell; and receive, via the first cell, the updated version of the first system information type based at least in part on the first indication of the version identifier being different from the second indication of the version identifier.

12. The UE of claim 1, wherein, to receive the updated version of the first system information type, the one or more processors are individually or collectively operable to execute the code to cause the UE to:

receive an indication of an update time that the updated version of the first system information type is created; and receive the updated version of the first system information type based at least in part on the first system information type being created at a time that precedes the update time.

13. The UE of claim 1, wherein, to receive the updated version of the first system information type, the one or more processors are individually or collectively operable to execute the code to cause the UE to:

receive an indication of a modification period associated with the first system information type, wherein the at least one change to the first system information type occurs during the modification period; and receive the updated version of the first system information type based at least in part on the modification period being elapsed.

14. The UE of claim 1, wherein, to receive the updated version of the first system information type, the one or more processors are individually or collectively operable to execute the code to cause the UE to:

perform one or more initial access procedures to obtain access to the first cell; and receive the updated version of the first system information type based at least in part on the first system information type being invalid during the one or more initial access procedures.

15. The UE of claim 1, wherein, to receive the first system information message that indicates the first system information type, the one or more processors are individually or collectively operable to execute the code to cause the UE to:

receive the first system information message via a master information block of the first cell, via a paging downlink control channel of the first cell, via a remaining minimum system information scheduling downlink control channel of the first cell, via one or more other downlink control channels associated with the first cell, or any combination thereof.

16. The UE of claim 1, wherein the first system information message includes assistance information that is indicative of one or more retransmissions of the first system information message that includes the first system information type.

17. The UE of claim 1, wherein the one or more processors are individually or collectively further operable to execute the code to cause the UE to:

transmit one or more messages that request one or more retransmissions of the first system information message that includes the first system information type, wherein the first system information message includes assistance information that instructs the UE to request the one or more retransmissions of the first system information message.

18. The UE of claim 1, wherein the first system information type comprises remaining minimum system information or other system information that is different from the remaining minimum system information.

19. The UE of claim 1, wherein the first cell comprises a network energy savings capable cell, and the second cell comprises an anchor cell.

20. A network entity, comprising:

one or more memories storing processor-executable code; and one or more processors coupled with the one or more memories and individually or collectively operable to execute the code to cause the network entity to:

obtain information indicative of at least one change of a first system information type of a plurality of system information types of a first cell, wherein the first cell is different from a second cell associated with the network entity and comprises a set of system configuration parameters associated with the first cell; and output, to a user equipment (UE) associated with the second cell, an indication of the at least one change to the first system information type of the first cell.

21. The network entity of claim 20, wherein, to output the information indicative of the at least one change to the first system information type of the first cell, the one or more processors are individually or collectively operable to execute the code to cause the network entity to:

output the indication of the at least one change to the first system information type via a second system information message associated with the second cell.

22. The network entity of claim 21, wherein the second system information message is indicative of the first cell operating in accordance with a first mode of operation, a set of neighboring cells operating in accordance with the first mode of operation, or both, wherein the first mode of operation comprises a network energy saving mode of operation, an on-demand system information transmission mode of operation, or both.

23. The network entity of claim 21, wherein the second system information message comprises an assistance information message that includes information associated with a validity of the first system information type of the first cell.

24. The network entity of claim 20, wherein, to output the information indicative of the at least one change to the first system information type of the first cell, the one or more processors are individually or collectively operable to execute the code to cause the network entity to:

output the indication of the at least one change to the first system information type via a downlink channel, a downlink control information message, or both.

25. The network entity of claim 24, wherein, to output the information indicative of the at least one change to the first system information type via the downlink channel, the one or more processors are individually or collectively operable to execute the code to cause the network entity to:

output the indication of the at least one change to the first system information type via one or more scheduling paging messages of the downlink channel, one or more system information modification messages of the downlink channel, or both.

26. The network entity of claim 24, wherein, to output the information indicative of the at least one change to the first system information type via the downlink channel, the one or more processors are individually or collectively operable to execute the code to cause the network entity to:

output an indication of a radio network temporary identifier via the downlink channel, wherein the radio network temporary identifier is indicative of a mode of operation of the first cell, a cell type of the first cell, or both.

27. The network entity of claim 20, wherein, to output the information indicative of the at least one change to the first system information type, the one or more processors are individually or collectively operable to execute the code to cause the network entity to:

output, at a first time, a first indication of a version identifier associated with the first system information type of the first cell; and output, at a second time subsequent to the first time, a second indication of the version identifier associated with the first system information type of the first cell.

28. The network entity of claim 20, wherein, to output the information indicative of the at least one change to the first system information type, the one or more processors are individually or collectively operable to execute the code to cause the network entity to:

output an indication of an update time that an updated version of the first system information type is created, or an indication of a modification period associated with the first system information type, wherein the at least one change to the first system information type occurs during the modification period.

29. A method for wireless communications at a user equipment (UE), comprising:

receiving a first system information message that indicates a first system information type of a plurality of system information types of a first cell, wherein the first system information type comprises a set of system configuration parameters associated with the first cell;

receiving, via a second cell that is different from the first cell, an indication of at least one change to the first system information type of the first cell; and receiving, via the first cell, an updated version of the first system information type based at least in part on the indication of the at least one change to the first system information type.

30. A method for wireless communications at a network entity, comprising:

obtaining information indicative of at least one change of a first system information type of a plurality of system information types of a first cell, wherein the first cell is different from a second cell associated with the network entity and comprises a set of system configuration parameters associated with the first cell; and outputting, to a user equipment (UE) associated with the second cell, an indication of the at least one change to the first system information type of the first cell.

* * * * *